(12) United States Patent
Reynier et al.

(10) Patent No.: US 7,595,611 B2
(45) Date of Patent: Sep. 29, 2009

(54) ELECTROCHEMICAL THERMODYNAMIC MEASUREMENT SYSTEM

(75) Inventors: Yvan Reynier, Meylan (FR); Rachid Yazami, Los Angeles, CA (US); Brent T. Fultz, Pasadena, CA (US)

(73) Assignees: California Institute of Technology, Pasadena, CA (US); Cantre National de le Recherche Scientifique, Paris (FR)

( * ) Notice: Subject to any disclaimer, the term of this patent is extended or adjusted under 35 U.S.C. 154(b) by 199 days.

(21) Appl. No.: 11/462,290

(22) Filed: Aug. 3, 2006

(65) Prior Publication Data

US 2007/0182418 A1    Aug. 9, 2007

Related U.S. Application Data

(60) Provisional application No. 60/705,535, filed on Aug. 3, 2005.

(51) Int. Cl.
*H02J 7/04* (2006.01)
(52) U.S. Cl. ........................................ 320/153; 320/152
(58) Field of Classification Search .................. 320/127, 320/128, 132, 153
See application file for complete search history.

(56) References Cited

U.S. PATENT DOCUMENTS

| | | | |
|---|---|---|---|
| 4,295,097 A | | 10/1981 | Thompson et al. |
| 4,725,784 A | | 2/1988 | Peled et al. |
| 6,392,385 B1 | * | 5/2002 | Barker et al. ................. 320/130 |
| 6,667,131 B1 | | 12/2003 | Vitins et al. |
| 7,227,336 B1 | | 6/2007 | Schalkwijk et al. |
| 2001/0001533 A1 | * | 5/2001 | Stuck Andersen et al. ... 320/150 |
| 2004/0046564 A1 | * | 3/2004 | Klang et al. ................. 324/426 |
| 2004/0128089 A1 | * | 7/2004 | Barsoukov et al. ............ 702/65 |
| 2004/0220758 A1 | * | 11/2004 | Barsoukov et al. ............ 702/63 |
| 2006/0208704 A1 | * | 9/2006 | Iwane et al. ................. 320/132 |

OTHER PUBLICATIONS

Bhatia et al. (1997) "Effect of Sintering Temperature on the Characteristics of Carbons Based on Mesocarbon Microbeads," *J. Mater. Sci.* 32(1):135-139.
Dahn et al. (1983) "Entropy Measurements on $Li_xTiS_2$," *Can J. Phys.* 61:1093-1098.

(Continued)

*Primary Examiner*—Akm E Ullah
*Assistant Examiner*—Nguyen Tran
(74) *Attorney, Agent, or Firm*—Greenlee, Winner and Sullivan, P.C.

(57) ABSTRACT

The present invention provides systems and methods for accurately characterizing thermodynamic and materials properties of electrodes and electrochemical energy storage and conversion systems. Systems and methods of the present invention are configured for simultaneously collecting a suite of measurements characterizing a plurality of interconnected electrochemical and thermodynamic parameters relating to the electrode reaction state of advancement, voltage and temperature. Enhanced sensitivity provided by the present methods and systems combined with measurement conditions that reflect thermodynamically stabilized electrode conditions allow very accurate measurement of thermodynamic parameters, including state functions such as the Gibbs free energy, enthalpy and entropy of electrode/electrochemical cell reactions, that enable prediction of important performance attributes of electrode materials and electrochemical systems, such as the energy, power density, current rate and the cycle life of an electrochemical cell.

60 Claims, 26 Drawing Sheets

OTHER PUBLICATIONS

Hallaj et al. (2000) "Entropy Changes Due to Structural Transformation in the Graphite Anode and Phase Change of the $LiCoO_2$ Cathode," *J. Electrochem Soc.* 147:2432-2436.

Hong et al. (May 1998) "Electrochemical-Calorimetric Studies of Lithium-Ion Cells," *J. Electrochem Soc.* 145(5):1489-1501.

Kataoka et al. (2002) "Lithium Storage Mechanism of Disordered Mesophase Carbon Fibers Studies by $^7$Li-Nuclear Magnetic Resonance," *Electrochem. Solid-State Lett.* 5(1):A10-A13.

Letellier et al. (2004) "The First situ $^7$Li NMR Study of the Reversible Lithium Insertion Mechanism in Disorganized Carbons," *J. Phys. Cem. Solids* 65:245-251.

Mabuchi et al. (Apr. 1995) "Charge-Discharge Characteristics of the Mesocarbon Microbeads Heat-Treated at Different Temperatures," *J. Electrochem. Soc.* 142(4): 1041-1046.

Mori et al. (Aug. 1995) "Lithium Doping/Undoping in Disordered Coke Carbons," *J. Power Sources* 56:205-208.

Oberlin et al. (1975) "Graphitization Studies of Anthracites by High Resolution Electron Microscopy," *Carbon* 13(5):367-376.

Papanek et al. (2001) "Neutron Scattering Studies of Disordered Carbon Anode Materials," *J. Phys. Condens. Matter* 13:8287-8301.

Papanek et al. (1996) "Lithium Insertion in Disordered Carbon-Hydrogen Alloys: Intercalation vs. Covalent Binding," *Chem. Mater.* 8(7):1519-1526.

Reynier et al. (2004) "Thermodynamics of Lithium Intercalation into Graphites and Disordered Carbons," *J. Electrochem. Soc.* 151(3):A422-A426.

Stevens et al. (Aug. 2001) "The Mechanisms of Lithium and Sodium Insertion in Carbon Materials," *J. Electrochem. Soc.* 148(8):A803-A811.

Tuinstra et al. (Aug. 1, 1970) "Raman Spectrum of Graphite," *J. Chem. Phys.* 53(3):1126-1130.

Wada et al. (1980) "'Diamond-Like' 3-fold Coordinated Amorphous Carbon," *J. Non-Cryst. Solids* 35:543-548.

International Search Report, Corresponding to International Application No. PCT/US06/30137, Mailed Jun. 10, 2008.

Written Opinion, Corresponding to International Application No. PCT/US06/30137, Mailed Jun. 10, 2008.

Reynier et al. (2007) "Evolution of lithiation thermodynamics with the graphitization of carbons," *J. Power Sources* 165:552-558.

Reynier et al. (2003) "The entropy and enthalpy of lithium intercalation into graphite," *J. Power Sources* 119-121, 850-855.

Reynier et al. (2004) "Entropy of Li intercalation in $Li_xCoO_2$," *Physical Review B 70*, 174304.

Yazami et al. (2006) "Thermodynamics and crystal structure anomalies in lithium-intercalated graphite," *J. Power Sources* 153, 312-318.

\* cited by examiner

Entropy of Li intercalation during charge and discharge of coke HTT at 2600°C

Entropy of intercalation and OCV during insertion

Layered structure of LiCoO₂

OCV profile of Li$_x$CoO$_2$ shown for 2 cells

Entropy profile for Li$_x$CoO$_2$ shown for 2 cells

Cell made with 25% of coke no HTT and 75% coke HTT 2600°C compared with simulation

ELECTROCHEMICAL THERMODYNAMIC MEASUREMENT SYSTEM

CROSS-REFERENCE TO RELATED APPLICATIONS

This application claims priority under 35 U.S.C. 119(e) to U.S. provisional Patent Application 60/705,535 filed Aug. 3, 2005, which is hereby incorporated by reference in its entirety.

STATEMENT REGARDING FEDERALLY SPONSORED RESEARCH OR DEVELOPMENT

This invention was made with United States governmental support awarded by the following agencies: Department of Energy DE-FG03-00ER15035 and DE-FG02-03ER15425. The United States has certain rights in this invention.

BACKGROUND OF INVENTION

Over the last few decades significant advances have been made in electrochemical storage and conversion devices expanding the capabilities of these systems in a variety of fields including portable electronic devices, air and space craft technologies, and biomedical devices. Current state of the art electrochemical storage and conversion devices tend to have designs and performance attributes specifically selected for compatibility with the diverse range of user applications. For example, current electrochemical storage systems span a range from light weight, stable batteries providing reliable, long runtimes to high capacity batteries capable of providing extremely high discharge rates. Despite recent advances, widespread development and demand for high power portable electronic products has created significant pressure for researchers to develop even more high performance batteries suitable for the wide range of these applications. Furthermore, demands of miniaturization in the field of consumer electronics and instrumentation continue to stimulate research into novel design and material strategies for reducing the sizes, weights and form factors of high performance batteries.

Many recent advances in electrochemical storage and conversion technology are directly attributable to discovery and integration of new materials for battery components. Lithium-ion battery technology, for example, continues to rapidly develop, at least impart, due to the integration of novel cathode and anode materials for these systems. From the pioneering discovery and optimization of intercalated carbon anode materials to more recent discoveries of nanostructured transition metal oxide intercalation cathode materials and nano-phosphate cathode materials, development of new materials has revolutionized the design and performance capabilities of primary and secondary lithium ion batteries. For example, advanced electrode materials have significantly enhanced the energy capacities, energy densities, discharge current rates and cycle life provided by these systems, thus positioning lithium ion batteries to be the preferred technology for the next generation of high-power portable electronic systems, hybrid electric car (HEV) and electric vehicles (EV). Advances in electrode materials also has great promise to positively impacted other systems including electrochemical capacitors and supercapacitors, and fuel cells, and is likely to be critical to implementation of these technologies for a range of device applications. Accordingly, the identification and performance evaluation of novel electrode materials is currently a research priority in the development of new and improved electrochemical energy storage and conversion systems.

Electrochemical energy storage and conversion devices use two electrodes; an anode and a cathode, which are electrically conductors, separated by a purely ionic conductor, the electrolyte. The electric current generated during discharge results from chemical reactions and physical processes (e.g., transport) taking place at the electrodes' surfaces in which positively or negatively charged ions are exchanged with the electrolyte. These processes in turn generate or absorb electrons so as to keep the electrical neutrality of the system. The charge exchange induces important modifications in the electrodes surface and bulk structures properties. In particular, charge transfer processes affect each electrode's potential and reaction rate, which set the energy and the power density outputs of an electrochemical power generating device. In the case of a rechargeable battery, for example, the mechanism(s) and extend of changes in the electrodes surface and bulk structure determine the cycle life, under specific thermodynamic and kinetic operating conditions (e.g., temperature, charge and discharge voltage limits, current rates and so on).

Knowing the thermodynamics of electrode reactions and physical transformations is essential in predicting the performance and stability of any electrochemical storage and conversion system. For example, important thermodynamic state functions establish, at least in part, the energy, the power and the cycle life of an autonomous electrochemical power source. In fact, the energy density reflects the total amounts of charges reversibly exchanged and the potential at which the exchange occurs. On the other hand, cycle life relates to the stability of states or phases resulting from electrodes transformations in the process of charge and discharge. All these processes are controlled, at least to a certain degree, by the thermodynamics of the electrode reactions.

A number of techniques have been developed and applied to evaluating the thermochemical kinetics of electrode reactions including electroanalytical methods (e.g., cyclic voltammetry, potentiometry etc.) and spectroscopic techniques (e.g. x-ray diffraction, NMR, LEEDs etc.). Given the importance of thermodynamics in virtually all electrochemical energy storage and conversion systems, however, there is currently a need in the art for systems and methods for measuring key thermodynamic parameters, such as changes in entropy, enthalpy and Gibbs free energy, with the accuracy needed for predicting and optimizing the performance attributes and capabilities of these systems. Such systems would play a significant role in identifying new materials for the next generation of electrochemical energy storage and conversion systems, and would significantly contribute to enhancing understanding of the thermochemical kinetics of established cathode and anode materials. New thermodynamic analysis systems also have great potential as versatile test instruments for characterizing materials properties and performance in commercially manufactured electrode systems, including batteries and fuel cells.

SUMMARY OF THE INVENTION

The present invention provides systems and methods for accurately characterizing thermodynamic and materials properties of electrodes and electrochemical energy storage and conversion systems. Systems and methods of the present invention are capable of simultaneously collecting a suite of measurements characterizing a plurality of interconnected electrochemical and thermodynamic parameters relating to the electrode reaction state of advancement, voltage and temperature. Enhanced sensitivity provided by the present methods and systems combined with measurement conditions that reflect thermodynamically stabilized electrode conditions allow very accurate measurement of thermodynamic parameters, including state functions such as the Gibbs free energy, enthalpy and entropy of electrode/electrochemical cell reactions, that enable prediction of important performance attributes of electrode materials and electrochemical systems, such as the energy, power density, current rate and the cycle life of an electrochemical cell.

The present systems and methods also allow sensitive characterization of the composition, phase and materials properties important for design and performance of electrodes in electrochemical systems. The present methods enable identification and characterization of phase transitions, crystallite size, surface and bulk defects and crystal structure defects in electrode materials that dramatically impact the electrochemical properties of electrodes and the performance of electrochemical storage and conversion systems. For example, thermodynamic state functions can be measured by the present systems and methods with an accuracy that enables identification of major or small phase transformations, which may be difficult, if not impossible, to detect via conventional means such as x-ray diffactometry or simple open-circuit cell potential measurements. Some small transformations may be the onset or the prelude of more drastic ones, which upon prolonged cycling will affect the battery's energy, power and cycle life performances. Detection of such transformations and understanding their origin is crucial for optimized electrode materials design.

Systems and methods of the present invention are also applicable for characterizing a range of thermodynamic parameters useful for designing, testing and characterizing electrochemical cells, such as primary and secondary batteries and electrode materials, including but not limited to intercalating electrode materials. The capabilities of the present systems and methods, however, extend beyond batteries and encompass electrode reactions in other electrochemical devices/systems including fuel cells, EDLCs, gas electrodes, catalysis, corrosions, electro-deposition, and electro-synthesis, where the acquisition of thermodynamics data also provides important insights on the energetics of electrode reactions and device performance.

In one aspect the present invention provides a measurement system for thermodynamically evaluating an electrochemical cell having an electrode pair (e.g., cathode and anode). A measurement system of the present invention comprises: (i) a means for measuring open circuit voltages of the electrochemical cell as a function of time; (ii) a composition controller electrically connected to the electrochemical cell for establishing selected electrochemical cell compositions, (iii) a temperature controller in thermal contact with the electrochemical cell for establishing a plurality of selected electrochemical cell temperatures for each of the selected compositions, and (iv) an open circuit voltage analyzer provided such that it receives open circuit voltage measurements as a function of time from the a means for measuring open circuit voltages. The composition controller is capable of establishing a plurality of the selected compositions and, therefore the combination of functionalities provided by the temperature and composition controller provides the capability of establishing a plurality of selected electrochemical cell temperature and composition combinations. The open circuit voltage analyzer receives open circuit voltage measurements as a function of time corresponding to the selected electrochemical cell temperature and composition combinations, and identifies open circuit voltages for thermochemically stabilized conditions of the electrochemical cell for the selected electrochemical cell temperature and composition combinations established by composition and temperature controllers.

In the context of this description, the term "thermodynamically stabilized conditions" refers to experimental conditions wherein measured open circuit voltages approximate equilibrium cell voltage such that the measurements can be used to determine thermodynamic parameters and materials properties with accuracies such that these parameter may be used to evaluate the electrochemical, materials and performance attributes of the electrodes and/or electrochemical cell. Measurement of open circuit voltages for thermodynamically stabilized conditions enables determination of state functions such as the Gibbs free energy, enthalpy and entropy of electrode/electrochemical cell reactions. It is intended that thermodynamically stabilized conditions include some deviations from absolute equilibrium conditions. In some embodiments open circuit voltages for thermodynamically stabilized conditions deviate from true equilibrium voltages by less than 1 mV and preferably for some embodiments conditions deviate from true equilibrium voltages by less than 0.1 mV. Under some experimental conditions of the present invention, the open circuit voltages are nearly an exact measure of the difference in Gibbs free energy of Li in the anode and cathode and any observed deviations originate from limitations in the measurement techniques employed during analysis. The ability to accurately identify open circuit voltage measurements reflecting thermodynamically stabilized conditions is useful for providing measurements of open circuit voltage, temperature and composition that may be used for characterization of important thermodynamic, electrochemical and materials properties of the electrodes analyzed.

In some embodiments, the expression "electrochemical cell" refers to a device comprising of three major active materials:

1) anode: is typically the electrode where an oxidation takes place. Oxidation is a loss of electron and can be schematized as: $R_a \rightarrow O_a + n_a e$, wherein $R_a$ is the reduced form and $O_a$ is the oxidized form of a chemical specie or used for the anode material. It comprises a neutral or positively charged (cation) or negatively charged (anion), $n_a$=number of electron moles exchanged in the anode reaction per $R_a$ mole. The anode is the negative pole of the cell during discharge;

2) cathode: is typically the electrode where a reduction (electron gain) takes place. The reaction is the reverse of the previous one, i. e. $O_c + n_c e \rightarrow R_c$, wherein $O_c$ is the oxidized form and $R_c$ is the reduced form of a chemical specie or used for the cathode material. It comprises a neutral or positively charged (cation) or negatively charged (anion), $n_c$=number of electron moles exchanged in the anode reaction per $O_c$ mole. The cathode is the positive pole of the cell during discharge; and 3) electrolyte: is a ionically conductive material, which role is to provide anions and cations needed for the electrode reactions to be achieved. It usually comprises a solvent medium and a solute material such as a salt, an acid or a base. In some cases, the electrolyte changes composition a result of the cell's charge and discharge (see, lead-acid batteries for example where sulfuric acid is consumed during discharge $Pb + PbO_2 + 2H_2SO_4 \rightarrow 2PbSO_4 + 2H_2O$)

As used herein, the expressions "electrochemical cell composition" or "composition of an electrochemical cell" are used synonymously and refer to compositions and/or physical states of active materials comprising the electrochemical cell (i.e., electrodes such as cathode and anode, and the electrolyte). Accordingly, in some embodiments electrochemical cell composition refers to surface and/or bulk compositions of cathode and anode materials, the composition of the electrolyte or any combination of these.). In some embodiments of the present invention, the expression "composition of an electrochemical cell" refers to the state of charge of the electrochemical cell or any component thereof (e.g. active material such as electrodes or electrolyte).

Examples of electrochemical cells useful in the present invention include, but are not limited to, batteries (primary and secondary) and fuel cells. While the above anode and cathode reactions are characteristic of electrode processes in batteries and fuel cells and involve electron transfer between the electrolyte and the electrode in a so called faradaic process (or Redox process), there are other non-faradaic processes that allow for electrical charges storage at the electrode surface without a charge transfer or a Redox process.

Examples of electrochemical cells useful in the present invention include, but are not limited to, electrochemical double layer capacitors (EDLC) and, electrochemical double layer supercapacitors. In electrochemical double layer capacitor EDLC (or supercapacitors), an anion $A^-$ or a cation $C^+$ is stored on the electrode surface owing to accumulation of electrons ($e^-$) or electron holes ($h^+$) at the electrode-electrolyte interface to balance the adsorbed charge species and form neutral species in a double layer structure: ($A^-$, $h^+$) and ($C^+$, $e^-$). During charge and discharge the anions and/or cations are adsorbed or desorbed from the surface, which causes an electric current flow in the external circuit (charger or load) to balance for surface charges.

Hybrid supercapacitors are an intermediary category of electrical power sources between batteries and EDLC. They are hybrid because they combine two electrodes, a one is a faradaic electrode like in a battery, the other is a non-faradaic (capacitive) electrode like in an EDLC.

Batteries, fuel cells and EDLC are polarized systems in that the voltage of the anode and the cathode are different. During discharge, the cathode has the higher voltage $V^+$, therefore it is the positive pole, whereas the anode bears the lower voltage $V^-$ and is the negative pole. The difference in voltage $U=V^+ - V^{31}$ depends on different parameters, the most important are:
  i. State of charge: (SOC) of each electrode. SOC is usually given in % of the total charge theoretically stored in the anode ($Q_{th}$(an)) or the cathode ($Q_{th}$(ca));
  ii. Density of discharge current (i). Under zero current, $U_{i=0}$ is the open-circuit voltage, which with time tends to an equilibrium value $U_\infty$ fixed by SOC and temperature;
  iii. Temperature;
  iv. State of health (SOH) of the system components: anode, cathode and electrolyte. The SOH varies with the system 'history', such as for the most common charge/discharge cycles, overcharge and overdischarge and thermal aging. Since a battery, a fuel cell and an EDLC function in a 'series' mode, any degradation of one of the active components: anode, cathode and electrolyte, will affect the cell's SOH.

With changing SOC, the electrodes surface or bulk composition changes and in some cases the electrolyte composition changes too. These changes in electrode surface and/or bulk composition and/or electrolyte composition establish, at least in part, the composition of the electrochemical cell (i.e. electrochemical cell composition) as described herein. Change in electrode composition is especially relevant for battery systems wherein electrolyte is consumed (e.g., lead acid, NiCd and Zn-silver batteries (See: reactions below)) and in normal or hybrid EDLCs.

A. Reactions for Lead Acid Battery

Negative Electrode:

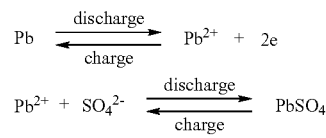

Positive Electrode:

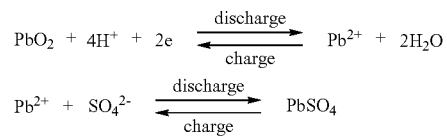

Overall Reaction:

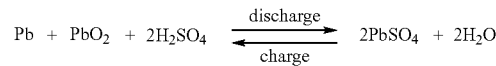

B. Reactions for Nickel-cadmium System

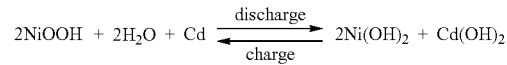

C. Reactions for Silver-zinc, Silver-cadmium and Silver-iron Systems

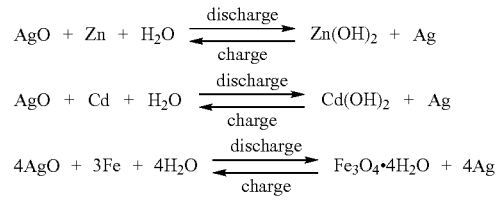

The present measurement system is capable of measuring thermodynamic functions of a half- or a full-cell at different SOC of the anode, cathode and electrolyte.

Means of measuring open circuit voltages useful in the present invention include, but are not limited to, voltmeters, multimeters, potentiometers, and/or galvanometers electrically connected to the electrodes (e.g., cathode and the anode) of the electrochemical cell. In some embodiments, a voltmeter having a very large internal impedance is used to measure open circuit voltages so as to avoid discharging the cell in the instrument. For some applications, for example, use of an a voltmeter with an internal impedance in the order of 1 G Ohm is preferable, and for some applications an internal impedance in the order of 10 G Ohm is preferable. A useful means of measuring open circuit voltages is a National Instrument Card Lab-PC-1200. In an embodiment, the means for measuring open circuit voltages is capable of measuring the open circuit voltages of the electrochemical cell with an accuracy to within about 1 mV, and preferably for some applications with an accuracy to within about 0.5 mV, and more preferably for some applications with an accuracy to within about 10 µV to about 100 µV. Optionally, the means for measuring open circuit voltages measures the open circuit voltages as a function of time with a temporal resolution ranging from a few seconds (e.g., 1 second) to a few minutes (e.g., 5 minutes). In some embodiments, a open circuit voltage measurements are made about every 10 seconds. Use of a means for measuring open circuit voltages providing good accuracy and temporal resolution provides measurements enabling accurate thermodynamic analysis of the electrochemical cell and also enhances the systems ability to correctly identify open circuit voltages representative of thermodynamically stabilized conditions.

As used herein the expression "composition of an electrochemical cell" refers generally to bulk compositions and/or surface compositions of components of an electrochemical cell. In some embodiments, composition of an electrochemical cell refers to the composition of electrodes of the electrochemical cell, such as compositions of electrodes (e.g., cathode and/or anode electrodes) of the electrochemical cell. In embodiments wherein the electrode(s) is an intercalating electrode the composition of an electrochemical cell may refer to the stoichiometry of the intercalating electrode materials with respect to the amount of intercalant physically associated with the electrode, the absolute amount of intercalant physically associated with the electrode, or the concentration of intercalant physically associated with the electrode. In some embodiments, the expression "composition of the electrochemical cell" refers to the composition of the electrolyte (e.g., the concentration(s) of components (ionic and/or nonionic) of the electrolyte). In some useful embodiments of the present invention, the expression "composition of an electrochemical cell" refers to the state of charge of the electrochemical cell or any component thereof, such as the state of charge of an electrode (cathode, anode, working, counter etc.) or combination of electrodes.

Any composition controller can be used in the present invention that is capable of establishing selected electrochemical cell compositions. In one embodiment, the composition controller is an electrochemical cell charger capable of charging the electrochemical cell to a state corresponding to selected cell compositions, and/or an electrochemical cell discharger capable of discharging the electrochemical cell to a state corresponding to selected cell compositions. Useful composition controllers for some applications are capable of charging and/or discharging the electrochemical cell under galvanostatic conditions. In one embodiment, the composition controller is capable of establishing selected states of charge (SOC) of the electrochemical cell corresponding to each of the selected electrochemical cell compositions. In the context of the present description SOC of an electrochemical cell may refer to SOC of an electrode (such as SOC of a cathode or anode) or combination of electrode. In some embodiments of the present invention, the composition controller is capable of determining the composition of the electrochemical cell using coulometry. In one embodiment, the composition controller is a coulometer capable of determining the state(s) of charge of an electrochemical cell using coulometry, for example by measuring the amount of electricity passed in the electrochemical cell. Optionally, states of charge are selected with an accuracy to within 5% or less, preferably for some applications with an accuracy to within 1% or less, and more preferably for some applications with an accuracy to within 0.1%. Alternatively, composition controllers of the present invention are capable of establishing selected open circuit voltages corresponding to each of the selected electrochemical cell compositions, and optionally selected open circuit voltages having an accuracy to within 1 mV.

Coulometry is a technique useful in the present invention for measuring and/or selecting the electrochemical cell composition by establishing and/or determining the SOC of an electrochemical cell. In some embodiments, therefore, the composition controller comprises a coulometer. For example, let i(t) be the current intensity in the cell at time 't'. The total amount of charge Q(t) at time τ is given by the time integration of i(t):

$$Q(\tau) = \int_0^\tau i(t)dt \qquad (1)$$

The SOC of anode (an), cathode (cat) and electrolyte (elec) is given in % as:

$$SOC(an, cat, elec.) = 100 \frac{Q(t)}{Q_{th}(an, cat, elec.)} \qquad (2)$$

The SOC of the full cell is fixed by that of the limiting component, anode, cathode or electrolyte:

SOC(full cell)=inf(SOC(an),SOC(cat),SOC(elec))    (3)

(the 'inf' function designs the lowest value of a group of parameters) The electrochemical techniques that allow to acquire i(t) include, but are not limited to, the following:

i. Galvanostatic method: here the applied current or current density is constant i(t)=I. The amount of electricity passed is therefore proportional to time: Q(t)=It. Usually the electrode or cell voltage is plotted versus time, a technique called chronopotentiometry.

ii. Constant voltage: applying a constant voltage different from the thermodynamic OCV will cause a current i(t) to flow in the cell. The later is recorded versus time, a technique called chronoamperometry. A variant of this method is the 'voltage step' method, where a series of voltage steps $U_n$ (n=step number) are applied usually with a constant increment δU ($U_n = U_0 \pm n\delta U$). At each step, the current is recorded and integrated.

iii. Potentio-dynamic methods such as linear sweep voltammetry and cyclic voltammetry: in this method the voltage is driven between two limit values $U_{up}$ and $U_{low}$ at a constant pace (U(t)=Uo±kt, k=constant, $U_{low}$<U(t)<$U_{up}$). The current response i(t) is recorded and generally plotted against U(t).

iv. Discharge under constant load: the cell is connected to a resistance and the current is recorded versus time.

By proper selection of the compositions, design and/or experimental conditions of the electrochemical cell, the measurement system of the present invention can probe the materials properties, SOH, thermodynamics and/or materials properties of a single component of the electrochemical cell, such as a selected electrode (cathode or anode) or the electrolyte, and chemical reactions occurring on or in a single component of the electrochemical cell. Selection of such electrochemical cell and measurement system configurations are beneficial for using the present measuring system to generate useful information (thermodynamic, composition, physical properties etc.) relating to a single active component of an electrochemical cell and chemical reactions thereof. For example, by choice of an electrochemical cell having a first electrode (e.g. counter electrode) having a chemical potential that is independent of the state of charge of the electrochemical cell, the system of the present invention is capable of generating measurements of open circuit voltage for thermodynamically stabilized conditions for different compositions and/or states of charge of the second electrode (e.g. working electrode). In one embodiment, for example, use of a first electrode (e.g. counter electrode) comprising a pure electrode material (e.g., a lithium, cadmium or zinc pure metal electrode) is useful for providing open circuit voltage measurements that principally reflect the state of charge, composition and/or chemical reactions of the second electrode (e.g. working electrode). More generally, however, systems of the present invention employing a reference electrode (i.e., a third electrode), in addition to first and second electrodes, may be used to provide measurements of open circuit voltage for thermodynamically stabilized conditions as a function of the composition and/or state of charge (SOC) of a selected electrode (e.g., cathode or anode). In these embodiments, the incorporation of a reference electrode (i.e. a third electrode), therefore, allows accurate measurements of open circuit voltage for thermodynamically stabilized conditions for different compositions, temperatures and chemical reactions of a selected electrode of the electrochemical cell. Use of such system configurations is highly beneficial for providing thermodynamic and other useful information that principally reflects the chemistry, physical properties, thermodynamics and structure of a single electrochemical cell component. For example, use of reference electrode or selection of an electrode having a chemical potential that is independent of the state of charge of the electrochemical cell allows thermodynamic state functions ($\Delta H$, $\Delta S$ and $\Delta G$) to be determined that correspond to a single electrode reaction. Such information is useful for the structural, thermodynamic and chemical characterization electrochemical cell components, and may serve the basis for testing and quality control methods for evaluating components of electrochemical cells.

Any temperature controller capable of establishing and maintaining an electrochemical cell at selected temperature(s) is useable in the present invention. In an embodiment, the temperature controller establishes the selected electrochemical cell temperatures with an accuracy equal to or greater than about 0.1 degrees Kelvin, and preferably for some applications an accuracy equal to or greater than about 0.05 degrees Kelvin. Useful temperature controllers for some applications provide and maintain stable selected electrochemical cell temperatures, for example selected temperatures stable to within about 1 degree Kelvin, preferably for some applications stable to with in about 0.5 degree Kelvin and more preferably for some applications stable to with in about 0.1 degree Kelvin. In an embodiment, the temperature controller establishes the selected electrochemical cell temperatures over a temperature range equal to about 10 degrees Kelvin, preferably for some applications equal to about 20 degrees Kelvin and more preferably for some applications equal to about 40 degrees Kelvin. For example, the present systems includes use of temperature controllers capable of establishing selected electrochemical cell temperatures for each of the selected compositions by establishing a sequence of about 2 to about 10 selected temperatures over temperatures selected from the range of about 213 degrees Kelvin to 333 degrees Kelvin (depending on electrochemical cell chemistry, conditions and composition) with a temperature sequence step selected over the range of about 2 degrees Kelvin to about 5 degrees Kelvin. The present systems also include temperature controllers capable of providing selected discrete electrochemical cell temperatures or providing a continuous increase or decrease in temperature (e.g., a temperature ramp).

Temperature controllers useable in the present invention include heaters or coolers, such as thermoelectric coolers, thermoelectric heaters, resistive heaters, temperature baths, heat pumps and/or radiative coolers. Use of a temperature controller comprising a Peltier plate thermoelectric cooler or heater is beneficial for some embodiments because it is capable of rapidly changing temperatures and establishing thermally stable electrochemical cell temperature conditions on a fast time scale. Use of a Peltier plate thermoelectric cooler or heater is also beneficial because it is capable of providing electrochemical cell temperatures preselected with good accuracy and is easily interfaced for computer control. Temperature controllers of the present systems may further comprise a means of measuring the temperature of the electrochemical cell such as a thermocouple in thermal contact with the electrochemical cell, and optionally may further comprises a processor for receiving temperature measurements from the thermocouple and for providing feedback control of a heater or cooler so as to establish and maintain selected electrochemical cell temperatures. In an embodiment, a temperature controller of the present system comprises a processor that uses a control algorithm, such as a proportional-integral derivative algorithm, to provide the feedback control of the heater or cooler so as to access thermally stable electrochemical cell conditions.

Open circuit voltage analyzers of the present invention are capable of determining open circuit voltages that correspond to thermodynamically stabilized conditions. In some embodiments, the open circuit voltage analyzer is also capable of open circuit voltage data acquisition and, optional of providing analysis of the data generated by the measurement system including calculating thermodynamic state functions, such as changes in entropy and enthalpy, and generating plots of thermodynamic state functions versus open circuit voltage or electrochemical cell composition useful for characterizing electrochemical cells and electrode materials. Useful open circuit analyzers are processors capable of executing algorithms that utilize open circuit measurements as a function of time to identify open circuit voltages that correspond to thermodynamically stabilized conditions. In an embodiment, the open circuit voltage analyzer is capable of calculating observed rates of change in open circuit voltage per unit time ($\Delta OCV/\Delta t)_{observed}$ for a selected electrochemical cell temperature and composition combination using the open circuit voltage measurements as a function of time received from the means of measuring open circuit voltage. For example, open circuit voltage analyzer is configured such that it receives open circuit voltages from the means of measuring open circuit voltage and calculates observed rates of change in open circuit voltage per unit time. For each observed rates of change in open circuit voltage per unit time, the open circuit voltage analyzer compares the absolute value of the observed rates of change in open circuit voltage per unit time for the selected electrochemical cell temperature and composition combination to a threshold rate of change in open circuit voltage per unit time $(\Delta OCV/\Delta t)_{threshold}$. The analyzer determines that an open circuit voltage is equal to the open circuit voltage of the electrochemical cell for thermochemically stabilized conditions for the selected electrochemical cell temperature and composition combination when the absolute value of the observed rate of change in open circuit voltage per unit time is equal to or less than the threshold rate of change in open circuit voltage per unit time:

$$\left| \left( \frac{\Delta OCV}{\Delta t} \right)_{observed} \right| \leq \left( \frac{\Delta OCV}{\Delta t} \right)_{Threshold},$$

In exemplary embodiments, the threshold rate of change in open circuit voltage as a function of time is equal to or less than 1 mV h$^{-1}$ (millivolt per hour) and preferably for some applications the threshold rate of change in open circuit voltage as a function of time is equal to or less than 0.3 mV h$^{-1}$, and more preferably for some applications the threshold rate of change in open circuit voltage as a function of time is equal to or less than 0.1 mV h$^{-1}$ In one embodiment, for example, the analyzer receives open circuit voltage measurements corresponding to various times, and uses this information to repeatedly (periodically or aperidocially) calculate observed rates of change in open circuit voltage per unit time. When the observed rate of change ($\Delta OCV/\Delta t)_{observed}$ calculated by the analyzer is equal to or less than the threshold rate of change ($\Delta OCV/\Delta t)_{threshold}$, the analyzer may determine that the open circuit voltage measurement most recently received from the means for measuring open circuit voltages is equal to the open circuit voltage for thermochemically stabilized conditions, may determine the next open circuit voltage measurement received from the means for measuring open circuit voltages is equal to the open circuit voltage for thermochemically stabilized conditions, or may calculate a time averaged valued of open circuit voltage corresponding to experimental conditions when $|(\Delta OCV/\Delta t)_{observed}| \leq (\Delta OCV/\Delta t)_{threshold}$.

A significant capability of the present system is that it provides a means of establishing electrochemical cell conditions and collecting voltage, time and temperatures measurements with the enhanced accuracy required to enable accurate thermodynamic analysis. Selection of a combination of a means for measuring open circuit voltage accurate to within about 1 mV and a temperature controller capable of establishing electrochemical cell temperatures to within about 0.1 degrees Kelvin, for example, provides a number of benefits. For example, this combination of systems component performance attributes provided measurements accurate enough to determine a range of important thermodynamic parameters and materials properties of many electrode materials and/or electrochemical energy conversion and storage systems. Further, these performance attributes enable thermodynamic state functions, such as the Gibbs free energy, enthalpy and entropy of electrode/electrochemical cell reactions, to be determined using measurements corresponding to a relatively narrow range of temperatures (e.g. less than or equal to about 10 degrees Kelvin). For some applications, confining measurements to a narrow range of electrochemical cell temperatures is beneficial for avoiding thermally activated phase changes in electrode materials that make thermodynamic analysis difficult and for avoiding electrochemical cell temperatures where self discharge of the electrochemical cell is significant.

The present invention includes methods and systems wherein selected electrochemical cell temperature and composition combinations are established by selecting the composition of the electrochemical cell and sequentially accessing a series of temperatures for each composition established, and includes methods wherein selected electrochemical cell temperature and composition combinations are established by selecting the temperature of the electrochemical cell and accessing a series of compositions for each temperature established. The present invention also includes, however, embodiments wherein specific selected electrochemical cell temperatures and compositions are established and experimentally characterized. The present invention includes embodiments wherein electrochemical cell temperature is varied by stepwise selection of discrete cell temperatures and embodiments wherein cell temperatures are continuously varied at a selected rate (e.g. a temperature ramp).

The present system is capable of providing measurements and characterization of a variety of different kinds of electrochemical cells. In one embodiment, a 3-electrode cell (working, counter and reference) is employed to study of the working electrode's reaction thermodynamics. In another embodiment, a 2-electrode cell is employed wherein the counter electrode can be assimilated to a reference electrode for the study of the working electrode's reaction thermodynamics. In another embodiment, a 2-electrode cell is employed with two working electrodes, positive and negative that compose a primary or a secondary battery.

The present invention also includes systems wherein a 3 electrode system (working electrode, counter electrode and reference electrode) is incorporated into the electrochemical cell. A 3-electrode system (working, counter, reference) is useful for accurate OCV measurements of the working electrode potential at equilibrium. A 3-electrode system is also useful for determining the voltage contribution of the working and the counter electrode to the overall cell OCV. In a battery consisting of a positive electrode and a negative electrode, it is useful to independently measure each electrode's potential versus a reference electrode, which can be achieved using a 3-electrode cell. A 3-electrode system (working, counter and reference) is also useful for experimental conditions when current is flowing in the electrochemical cell. The working electrode potential is measured against a reference electrode, which by definition takes a constant potential at a defined temperature. Usually the temperature dependence of the reference electrode is negligible compared to that of the working electrode. In lithium batteries research, for example, typically a 3-electrode cell comprises of metallic lithium for the reference and for the counter electrode. Reference electrodes useful for aqueous batteries include Hg/Hg$_2$Cl$_2$/KCl, Hg/HgO/Ba(OH)$_2$, Ag/AgCl/HCl, Pt/quinone-hydroquinone/HCl.

In some embodiment, the measurement system further comprises a reference electrode to measure the working electrode (first electrode) potential. In these embodiments, the counter electrode (second electrode) is used for selectively varying the working electrode's composition. This system allows for open circuit voltages to be measured for a variety of working electrode compositions. Open circuit voltages measured in these embodiments can then be used to characterize the materials properties, thermodynamics and physical properties of the working electrode and/or probe chemical reactions occurring on/in the working electrode. This is a substantial benefit of use of the present methods and system with a 3-electrode electrochemical cell. There are some case cases where the counter electrode can also play the role of reference electrode, such as cells based on metallic lithium anodes (sometimes called half-cells). In these cases, a 2 electrode cell is sufficient to determine the working electrode potential at equilibrium and therefore its reaction thermodynamics functions.

In another aspect the present invention provides a method for thermodynamically evaluating an electrochemical cell having an electrode pair (e.g., cathode and an anode) comprising the steps of: (i) controlling the composition of the electrochemical cell to establish a plurality of selected electrochemical cell compositions; (ii) controlling the temperature of the electrochemical cell to establish a plurality of selected electrochemical cell temperatures for each of the selected electrochemical cell compositions, thereby establishing a plurality of selected electrochemical cell temperature and composition combinations; (iii) measuring open circuit voltages of the electrochemical cell as a function of time for the selected electrochemical cell compositions and the selected electrochemical cell temperatures; and (iv) identifying open circuit voltages for thermochemically stabilized conditions of the electrochemical cell for the selected electrochemical cell temperature and composition combinations. In an embodiment wherein the electrochemical cell comprises a secondary battery, the method further comprises the step of cycling the secondary battery several times (e.g. 2-20 times) prior to thermodynamic evaluation. In an embodiment, the step of controlling the composition of said electrochemical cell is carried out by establishing selected states of charge of the electrochemical cell and/or selected states of charge of the electrode(s) corresponding to each of said selected electrochemical cell compositions.

In some methods of the present invention, open circuit voltages of the electrochemical cell are measured with an accuracy to within 1 mV, preferably for some applications an accuracy to within 0.5 mV for some applications and more preferably for some applications an accuracy to within 0.1 mV, and open circuit voltages of the electrochemical cell are measured as a function of time with temporal resolution equal to or greater than 1 second. In some embodiments, the step of controlling the composition of the electrochemical cell is carried out by establishing open circuit voltages corresponding to each of the selected electrochemical cell compositions, optionally with an accuracy to within 1 mV, and preferably for some applications with an accuracy to within 0.1 mV. In some embodiments, the step of controlling the temperature of the electrochemical cell establishes the selected electrochemical cell temperatures to within about 0.5 degrees Kelvin, preferably to within about 0.25 degrees Kelvin for some applications, and more preferably to within about 0.05 degrees Kelvin for some applications In an embodiment, the step of controlling the temperature of the electrochemical cell comprises the steps of: (i) measuring the temperature of the electrochemical cell; (ii) providing feedback control of a heater or cooler in thermal contact with the electrochemical cell to establish the selected electrochemical cell temperatures, optionally using a feedback control algorithm such as a proportional-integral derivative algorithm.

In an embodiment, the step of identifying open circuit voltages for thermochemically stabilized conditions of the electrochemical cell comprises the steps of: (i) calculating observed rates of change in open circuit voltage per unit time for the combinations of selected electrochemical cell compositions and a selected electrochemical cell temperatures using the open circuit voltage measurements as a function of time; (ii) comparing the absolute value of observed rates of change in open circuit voltage per unit time for a combination of a selected electrochemical cell composition and a selected electrochemical cell temperature to a threshold rate of change in open circuit voltage per unit time; and (iii) identifying an open circuit voltage is equal to the open circuit voltage of the electrochemical cell for thermochemically stabilized conditions for a selected electrochemical cell composition and a selected electrochemical cell temperature when the absolute value of the observed rate of change in open circuit voltage per unit time is equal to or less than the threshold rate of change in open circuit voltage per unit time. In some embodiments, these steps are carried out by a processor capable of executing an algorithm for determining open circuit voltages that correspond to thermodynamically stabilized conditions. In some embodiments said threshold rate of change in open circuit voltage per unit time is equal to or less than about 1 mV $h^{-1}$.

Methods of the present invention may further comprise a number of analysis steps wherein measurements of open circuit voltage, electrochemical cell composition, time and/or temperature are used to characterize thermodynamics and materials properties of the electrodes, electrolyte and/or electrochemical cell and/or to predict electrochemical performance parameters for these systems such as energy, energy density, power density, current rate, discharge voltage, capacity and the cycle life.

One method of the present invention, for example, further comprises analysis steps of generating plots of the open circuit voltages of the electrochemical cell for thermochemically stabilized conditions versus temperature for each of the selected electrochemical cell compositions. In this embodiment, determination of slopes and intercepts for each of the plots corresponds to measured changes in entropy ($\Delta S$) and enthalpy ($\Delta H$), respectively, for reactions at the electrodes for each of the cell compositions. Analysis steps of this aspect of the present invention may further comprise calculating changes in Gibbs free energy ($\Delta G$) for reactions at the electrodes for each of the cell compositions using the determined entropy and enthalpy data.

Another method of the present invention, for example, further comprises analysis steps of: (i) generating a plot of measured changes in entropy ($\Delta S$) versus electrochemical cell composition and/or (ii) generating a plot of measured changes in enthalpy ($\Delta H$) versus electrochemical cell composition; (iii) a plot of measured changes in entropy ($\Delta S$) versus open circuit voltage and (iv) a plot of changes in entropy ($\Delta S$) versus changes in enthalpy ($\Delta H$). Features in such plots of $\Delta S$ or $\Delta H$ versus electrochemical cell composition or open circuit voltage are useful for characterizing phase (and changes in phase), morphology and/or structural defects in electrode materials. Furthermore, such parametric entropy and enthalpy curves can be used as a 'fingerprint' for characterizing and/or identifying an electrode (e.g., cathode and an anode) material, an electrolyte and/or an electrochemical cell. As the material cycles in the battery, these traces change due to physical and/or chemical changes occurring in the electrode materials. The present methods, therefore, are useful for evaluating the 'state of health' of an electrode material upon heavy cycling or exposing to high temperatures or to overpotentials (overcharge and overdischarge for a cathode and an anode, respectively) or to provide quality control information regarding the presence of defects in electrodes and electrochemical systems.

Even when the composition of the electrode material is not well known, it is still very useful to plot the $\Delta S$ versus the OCV or electrochemical cell composition to ascertain the materials properties of the electrodes. The $\Delta S$ and the $\Delta H$ are functions of the chemical composition of the electrode material, and parametric plots of $\Delta S$ and $\Delta H$ versus open circuit voltage or composition is very sensitive to differences in the composition and structures of different materials. Accordingly, these parametric plots can serve as a "fingerprinting" for different materials so as to ascertain the identity, composition, structure, defect structure etc. of electrode materials, even when composition is not well known in advance.

Thermodynamic measuring methods systems of the present invention enable a broad range of functionalities. In one embodiment, methods of the present invention comprises a method of predicting one or more performance parameter of an electrode and/or electrochemical cell including the capacity, specific energy, power, cycle life, cell voltage, stability, self discharge or discharge current of the electrochemical cell. In one embodiment, methods of the present invention comprise a method of assessing the composition, morphology, phase or physical state of an electrode(s) or electrochemical cell. In one embodiment, methods of the present invention comprise a method of identifying surface, bulk and crystal defect structures in electrode materials or electrochemical cell. In one embodiment, methods of the present invention comprise a method of identifying a phase transition in electrode materials.

In one aspect, the SOH of a battery is related to the SOH of one (or a combination) of three major cell components: anode, cathode and electrolyte. The thermodynamic functions ($\Delta G$, $\Delta S$ and $\Delta H$) of each electrode reaction is used as the fingerprint of the corresponding electrode's SOH. These functions can be plotted versus the 'electrode composition' or the 'electrode Potential' to provide a quantitative characterization of the electrochemical cell or any component thereof.

Systems and methods of the present invention are useful for thermodynamically evaluating a range of electrochemical cells including primary and secondary batteries such as lithium ion batteries, zinc-carbon (Leclanche and saline) batteries, zinc-manganese oxide alkaline batteries, lithium ion polymer batteries, lithium batteries, nickel cadmium batteries, nickel-metal hydride batteries, lead acid batteries, nickel hydrogen batteries, and other types of electrochemical cells including, but not limited to, fuel cells, photovoltaics cells and electrochemical capacitors (and supercapacitors) and double-layer capacitors. Exemplary battery systems that may be evaluated, characterized and analyzed by the present invention are summarized in Table I (primary batteries) and Table II (secondary batteries). Analysis of battery systems having a pure counter electrode, such as pure lithium metal, is convenient for some applications of the present invention, because the chemical potential of the pure material in the counter electrode (e.g., lithium metal) is independent of the state of charge.

TABLE 1

Exemplary primary battery systems

| Primary Battery System | Chemistry | | | Cell Voltage, V | | | | Operating Temperature, ° C. |
|---|---|---|---|---|---|---|---|---|
| | Anode | Cathode | Electrolyte | Nominal | Open-circuit | Midpoint | End | |
| Zinc-carbon (Leclanché) | Zn | $MnO_2$ | $NH_4Cl$ and $ZnCl_2$ (aqueous solution) | 1.5 | 1.5-1.75 | 1.25-1.1 | 0.9 | −5 to 45 |
| Zinc-carbon (zinc chloride) | Zn | $MnO_2$ | $ZnCl_2$ (aqueous solution) | 1.5 | 1.6 | 1.25-1.1 | 0.9 | −10 to 50 |
| $Mg/MnO_2$ | Mg | $MnO_2$ | $MgBr_2$ or $Mg(ClO_4)$ (aqueous solution) | 1.6 | 1.9-2.0 | 1.8-1.6 | 1.2 | −20 to 60 |
| $Zn/Alk./MnO_2$ | Zn | $MnO_2$ | KOH (aqueous solution) | 1.5 | 1.5-1.6 | 1.25-1.15 | 0.9 | −20 to 55 |
| Zn/HgO | Zn | HgO | KOH or NaOH (aqueous solution) | 1.35 | 1.35 | 1.3-1.2 | 0.9 | 0 to 55 |
| Cd/HgO | Cd | HgO | KOH (aqueous solution) | 0.9 | 0.9 | 0.85-0.75 | 0.6 | −55 to 80 |
| $Zn/Ag_2O$ | | $Ag_2O$ or AgO | KOH or NaOH (aqueous solution) | 1.5 | 1.6 | 1.6-1.5 | 1.0 | 0 to 55 |
| Zinc/air | Zn | $O_2$ (air) | KOH (aqueous solution) | 1.5 | 1.45 | 1.3-1.1 | 0.9 | 0 to 50 |
| $Li/SO_2$ | Li | $SO_2$ | Organic solvent, salt solution | 3.0 | 3.1 | 2.9-2.75 | 2.0 | −55 to 70 |
| $Li/SOCl_2$ | Li | $SOCl_2$ | $SOCl_2$ w/$AlCl_4$ | 3.6 | 3.65 | 3.6-3.3 | 3.0 | −60 to 85 |
| $Li/MnO_2$ | Li | $MnO_2$ | Organic solvent, salt solution | 3.0 | 3.3 | 3.0-2.7 | 2.0 | −20 to 55 |
| $Li/FeS_2$ | Li | $FeS_2$ | Organic solvent, salt solution | 1.5 | 1.8 | 1.6-1.4 | 1.0 | −20 to 60 |
| Solid State | Li | I2(P2VP) | Solid | 2.8 | 2.8 | 2.8-2.6 | 2.0 | 0 to 200 |

TABLE 2

Exemplary secondary battery systems

| Secondary Battery System | Common Name | Chemistry | | | Cell voltage (typical), V | | | | Operating Temperature, °C. |
|---|---|---|---|---|---|---|---|---|---|
| | | Anode | Cathode | Electrolyte | Nominal | Open-Circuit | Operating | End | |
| Lead-acid | SLI | Pb | PbO$_2$ | H$_2$SO$_4$ (aqueous solution) | 2.0 | 2.1 | 2.0-1.8 | 1.75 (lower operating and end voltage during cranking operation) | −40 to 55 |
| | Traction | Pb | PbO$_2$ | H$_2$SO$_4$ (aqueous solution) | 2.0 | 2.1 | 2.0-1.8 | 1.75 | −20 to 40 |
| | Stationary | Pb | PbO$_2$ | H$_2$SO$_4$ (aqueous solution) | 2.0 | 2.1 | 2.0-1.8 | 1.75 (except when on float service) | −10 to 40 |
| | Portable | Pb | PbO$_2$ | H$_2$SO$_4$ (aqueous solution) | 2.0 | 2.1 | 2.0-1.8 | 1.75 (where cycled) | −40 to 60 |
| Nickel-cadmium | Vented pocket plate | Cd | NiOOH | KOH (aqueous solution) | 1.2 | 1.29 | 1.25-1.00 | 1.0 | −20 to 45 |
| | Vented sintered plate | Cd | NiOOH | KOH (aqueous solution) | 1.2 | 1.29 | 1.25-1.00 | 1.0 | −40 to 50 |
| | Sealed | Cd | NiOOH | KOH (aqueous solution) | 1.2 | 1.29 | 1.25-1.00 | 1.0 | −40 to 45 |
| | PNC | Cd | NiOOH | KOH (aqueous solution) | 1.2 | 1.29 | 1.25-0.85 | 1.00-4.00 | −90 to 80 |
| | Nickel-iron (conventional) | Fe | NiOOH | KOH (aqueous solution) | 1.2 | 1.37 | 1.35-1.05 | 1.0 | −10 to 45 |
| | Nickel-zinc | Zn | NiOOH | KOH (aqueous solution) | 1.65 | 1.73 | 1.6-1.4 | 1.2 | −10 to 50 |
| | Zinc/silver oxide (silver-zinc) | Zn | AgO | KOH (aqueous solution) | 1.5 | 1.86 | 1.7-1.3 | 1.0 | −20 to 60 |
| | Cadmium/silver oxide (silver-cadmium) | Cd | AgO | KOH (aqueous solution) | 1.1 | 1.41 | 1.4-1.0 | 0.7 | −25 to 70 |
| | Nickel-hydrogen | H$_2$ | NiOOH | KOH (aqueous solution) | 1.4 | 1.32 | 1.3-1.15 | 1.0 | 0 to 50 |
| | Nickel-metal hydride | MH | NiOOH | KOH (aqueous solution) | 1.2 | 1.4 | 1.25-1.10 | 1.0 | −20 to 50 |
| | Rechargeable "primary" types, Zn/MnO$_2$ | Zn | MnO$_2$ | KOH (aqueous solution) | 1.5 | 1.5 | 1.3-1.0 | 1.0 | −20 to 40 |
| | Lithium ion systems | C | LiCoO$_2$ | Organic solvent | 4.0 | 4.1 | 4.0-3.0 | 3.0 | −20 to 50 |

The methods and systems of the present invention also are capable of thermodynamic evaluating virtually any electrochemical system having an electrode pair including, but not limited to, gas electrodes, electrochemical sensors, catalysis materials, corrosion systems, electro-deposition systems and electrosynthesis systems.

The methods and systems of the present invention also are capable of thermodynamic evaluating and otherwise analyzing virtually any type of electrode or any electrode material including, but not limited to, intercalating electrode materials such as carbon electrodes, nanostructure metal oxide electrodes and nano-phosphate electrodes.

BRIEF DESCRIPTION OF THE DRAWINGS

FIG. 2-FIG. 2A provides temperature and open circuit voltage measurements for a typical temperature cycle for a graphite cell at x~0.2 in Li$_x$C$_6$. The dashed curve represents the temperature of the cell and the solid curve the OCV.

Figure 2A:
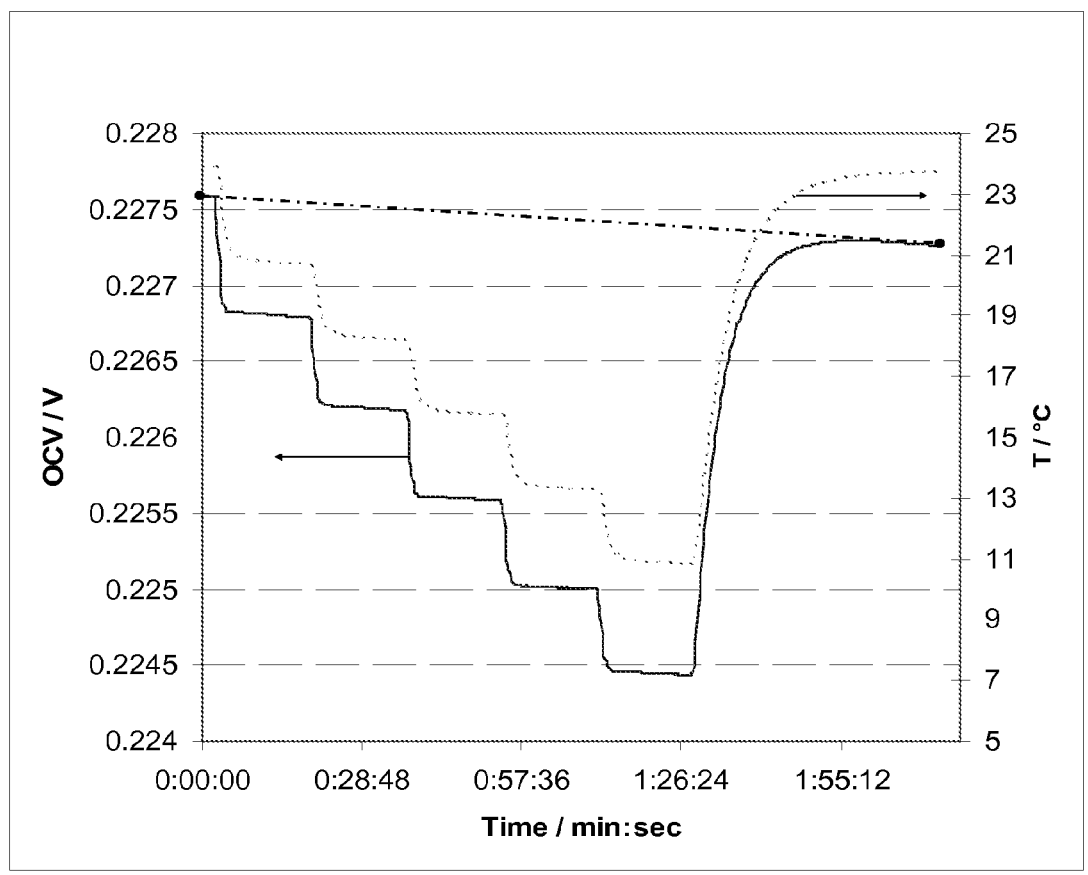
Figure 2B:
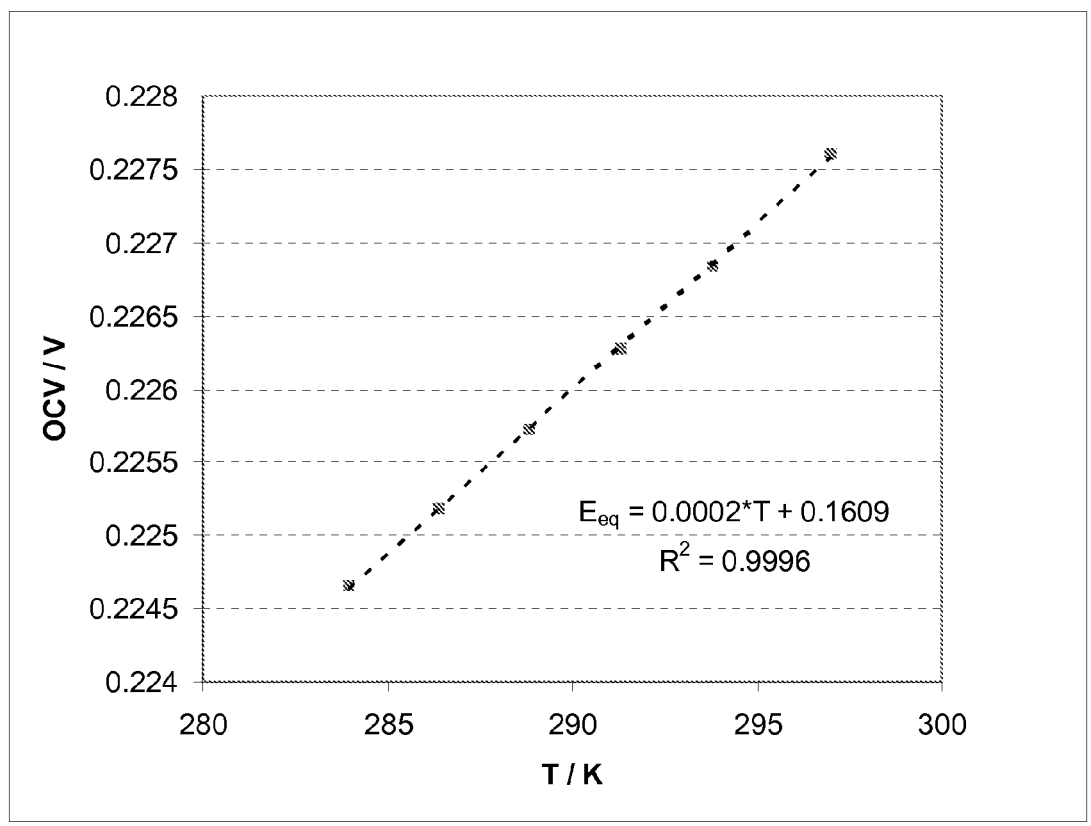
FIG. 2B provides a linear regression of the OCV vs. T for a graphite at x~0.2. The linear slope of the voltage as a function of temperature gives ΔS through equation (7). Equation (8)

shows that ΔH can be calculated with the y-intercept of the open circuit voltage U vs. temperature, obtained from a linear regression (FIG. 2B). Note in this case the excellent linear behavior of the U(T) curve, with $R^2=0.9996$.

Figure 3:
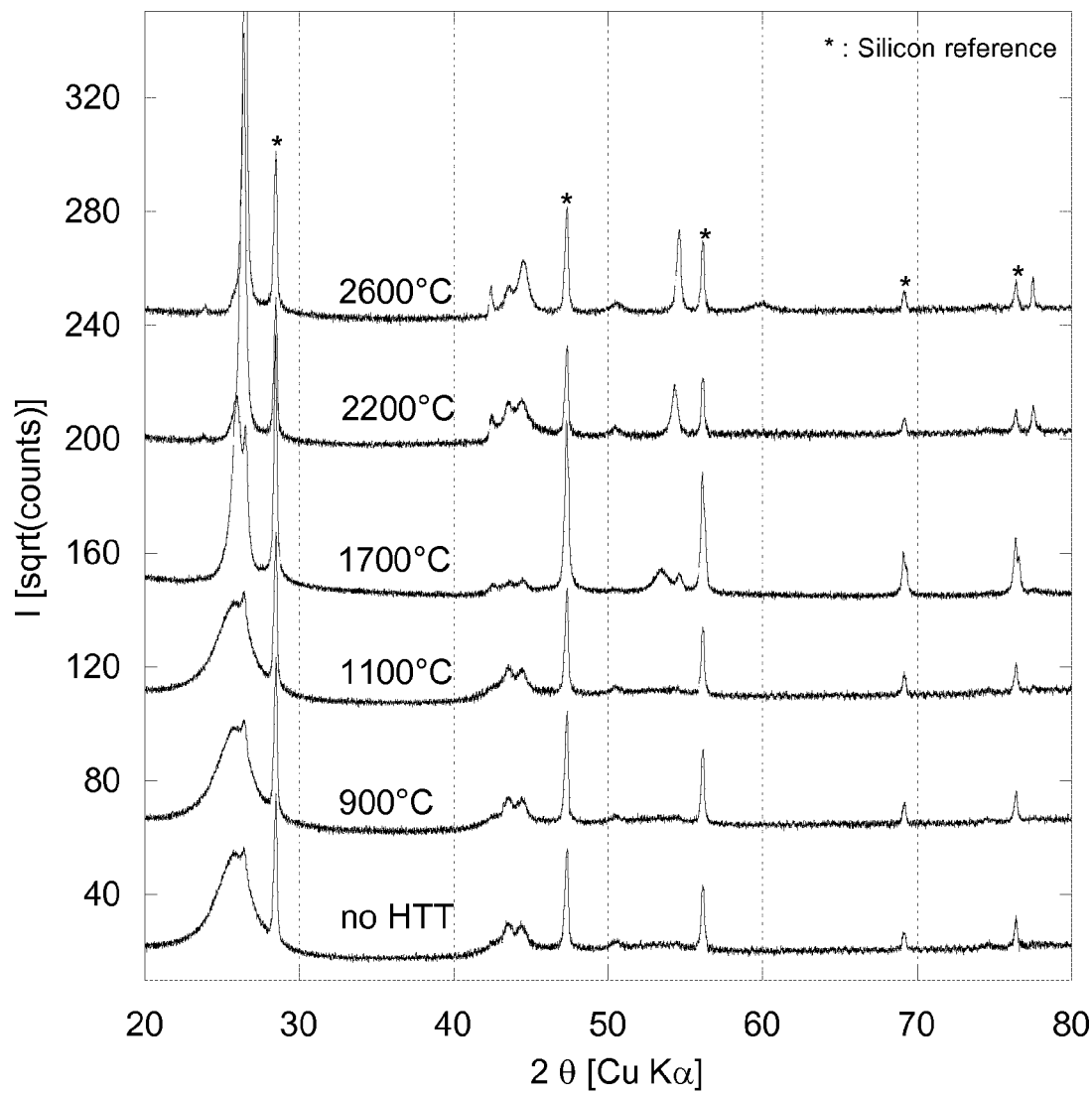

FIG. 3. XRD pattern of the coke samples heat treated at different temperatures, with an internal silicon reference (labeled *).

Figure 4:
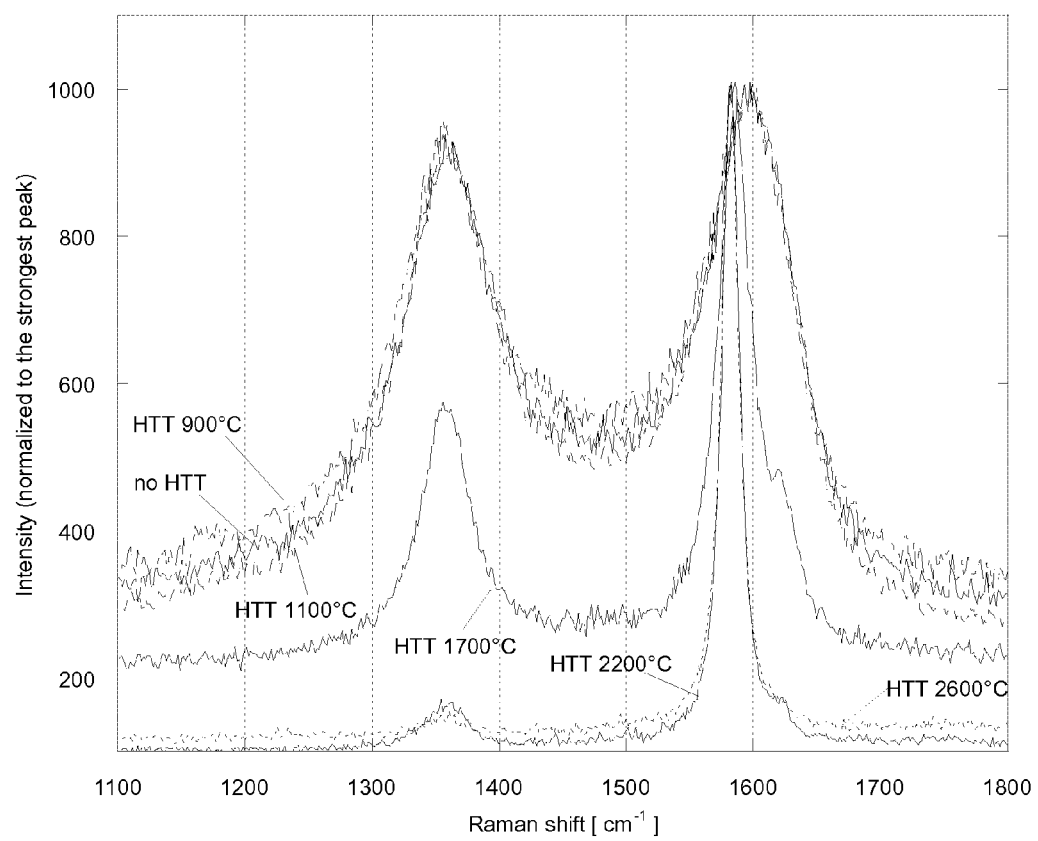

FIG. 4. Raman spectra for all samples.

Figure 5:
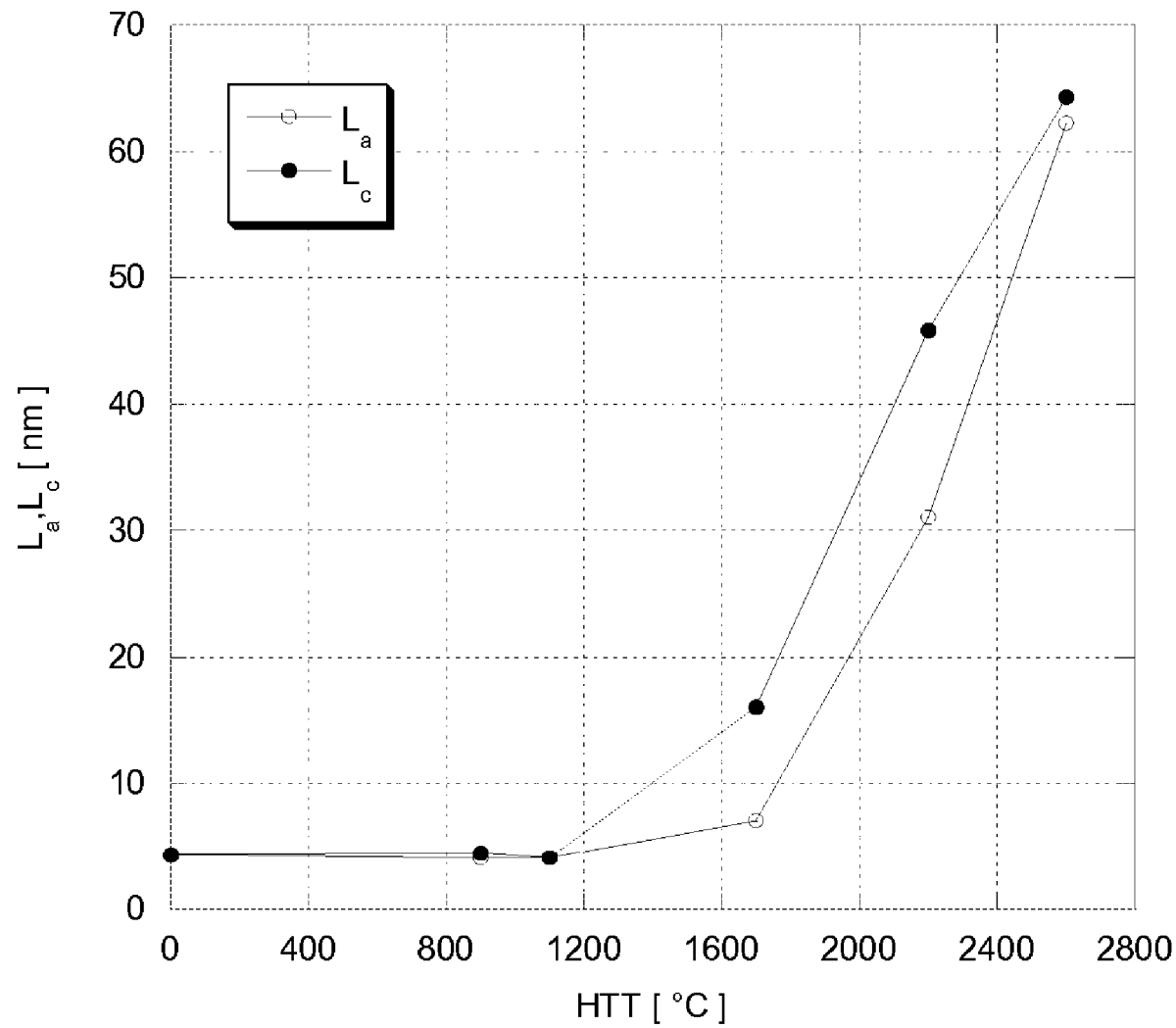

FIG. 5. Crystal coherence lengths as a function of heat treatment temperature based on Raman spectroscopy, $L_a$, and $L_c$ from XRD patterns.

Figure 6:
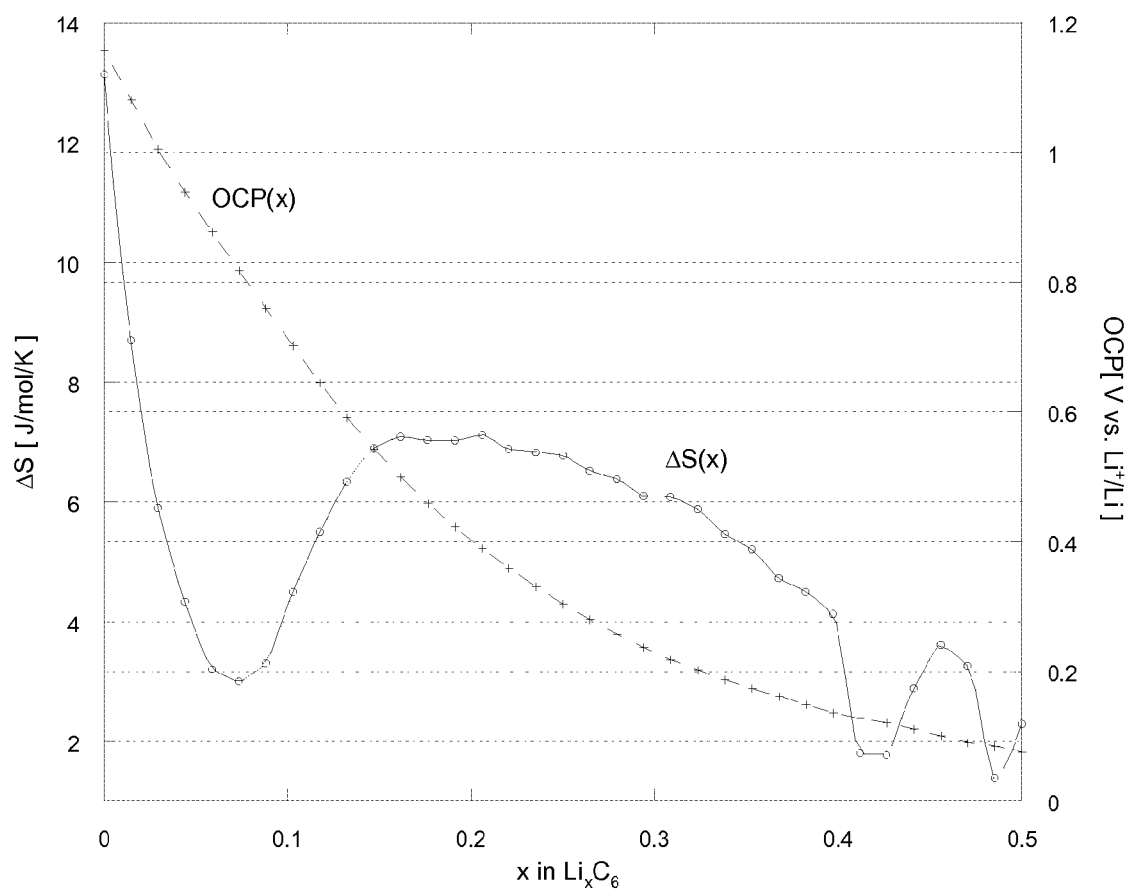

FIG. 6. Entropy of lithium intercalation into coke with no heat treatment and corresponding OCV during charge (delithiation).

Figure 7:
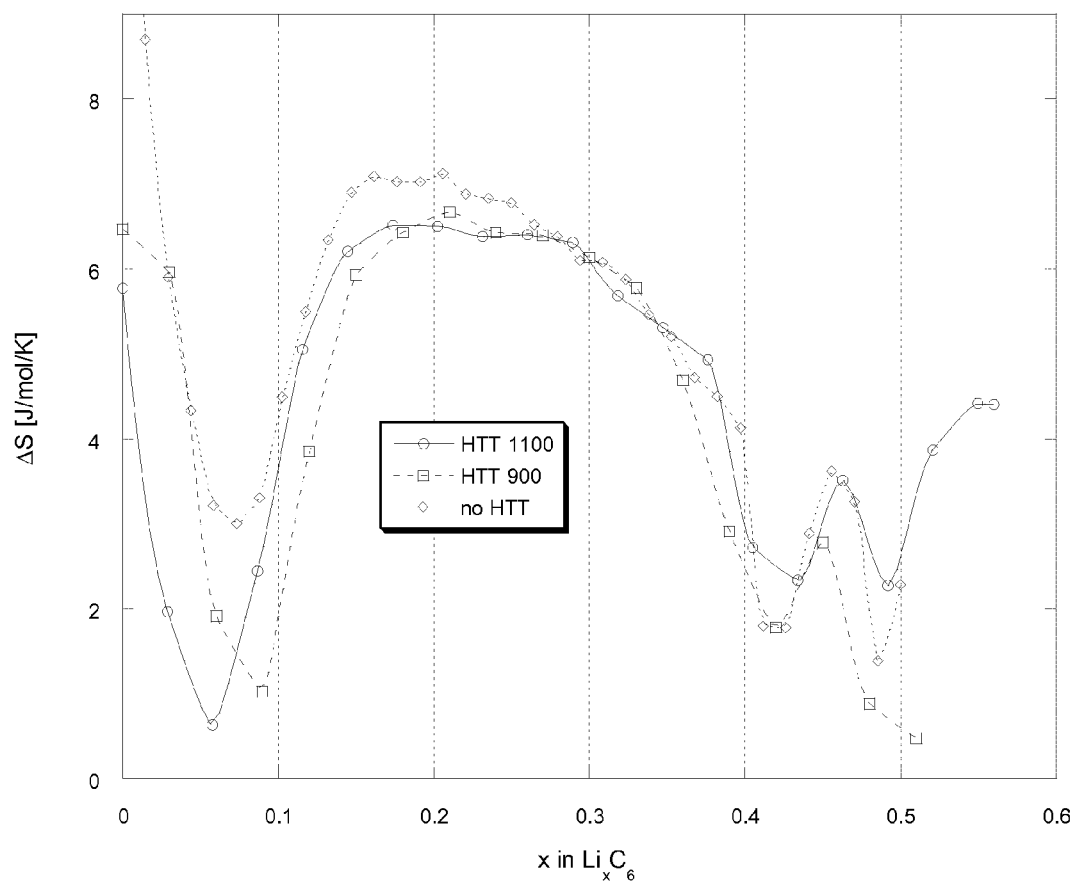

FIG. 7. Comparison of the entropy of lithiation for the samples with low heat treatment temperatures (precursor, 900° C. and 1100° C.).

Figure 8:
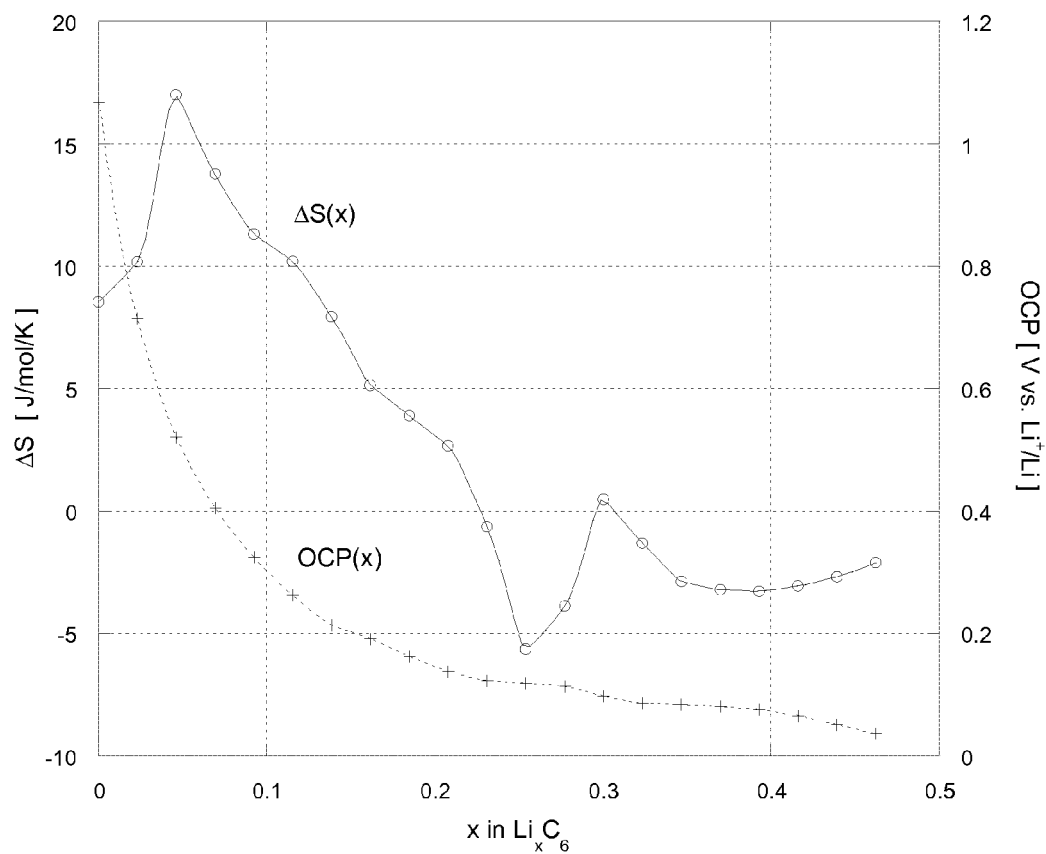

FIG. 8. Entropy of lithiation and OCV of a coke heat treated at 1700° C. (discharge curve).

Figure 9:
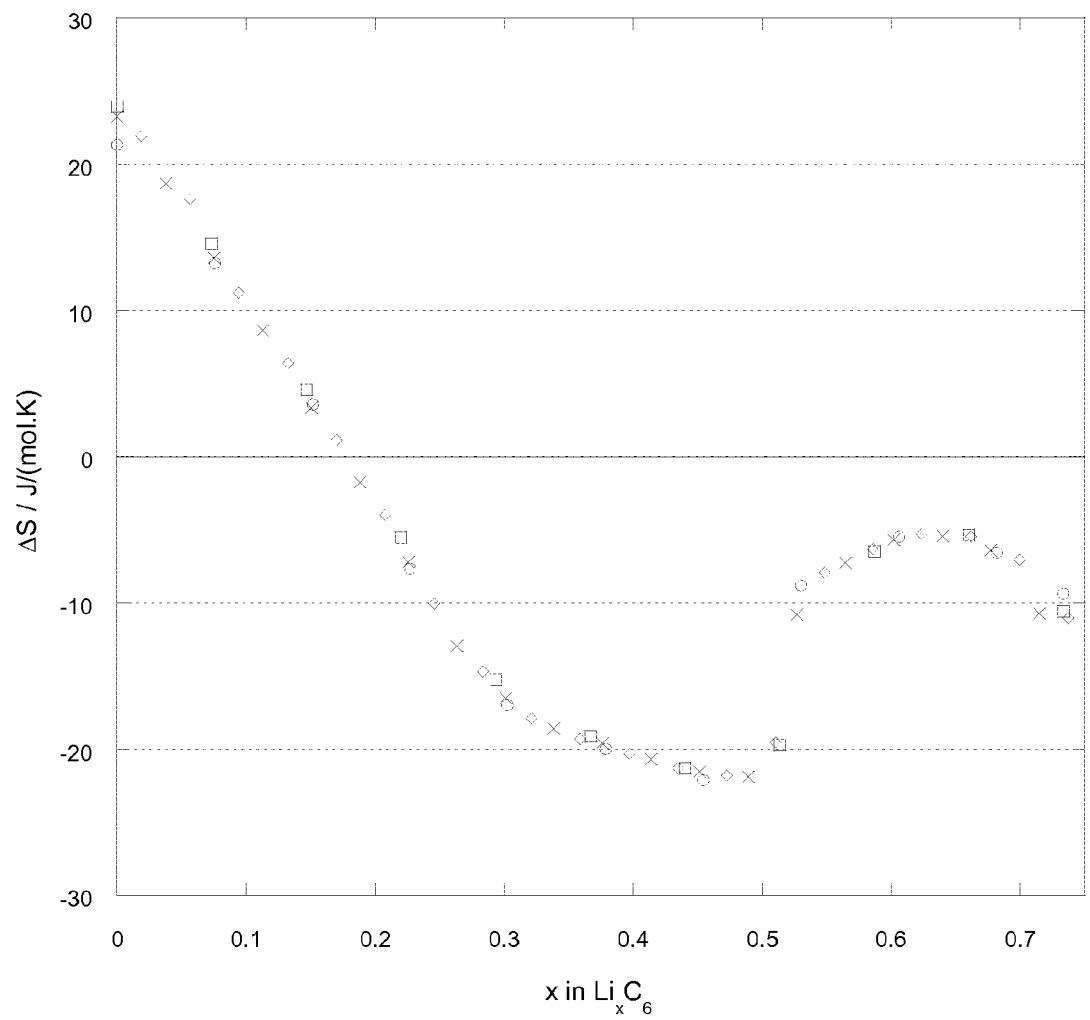

FIG. 9. Entropy of lithiation for the material heat treated at 2200° C. Data were averaged from two pairs of cells during discharge to show reproducibility.

Figure 10:
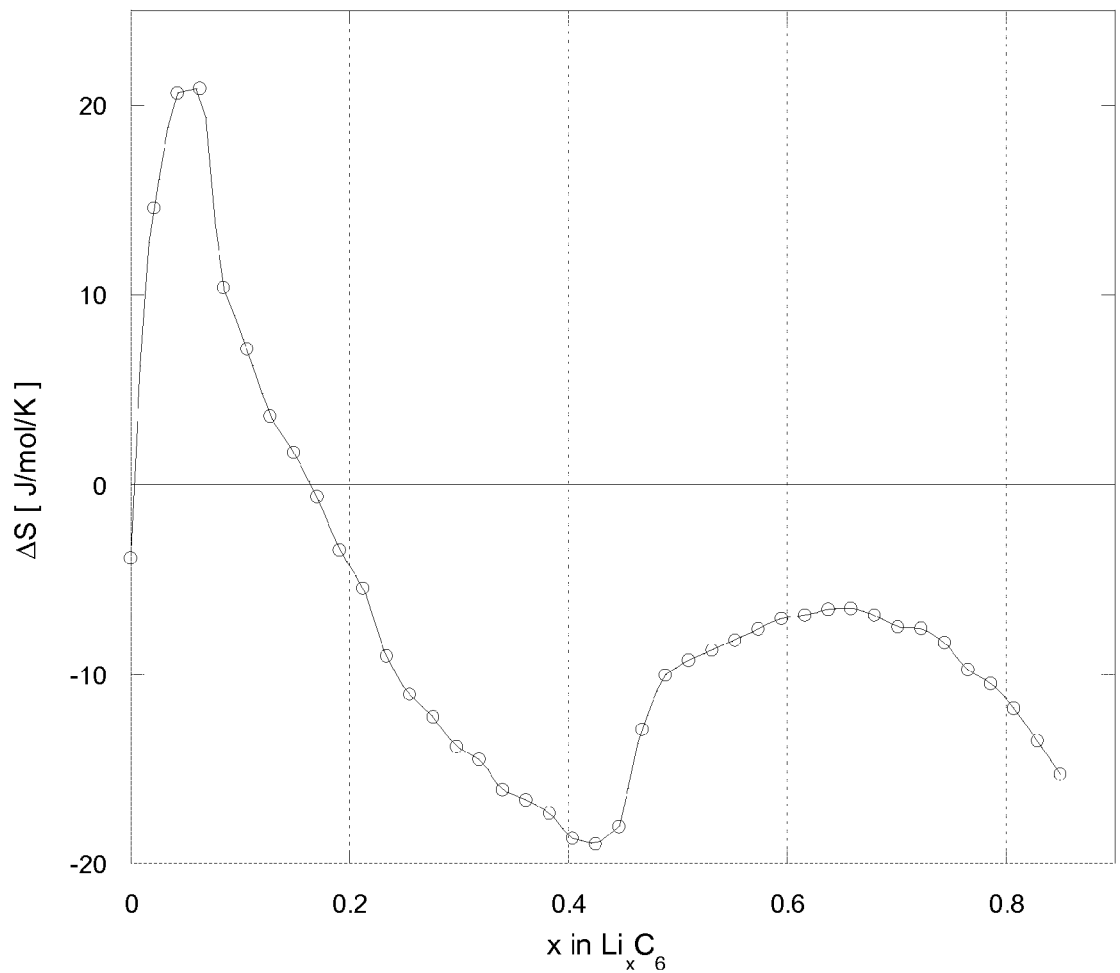

FIG. 10. Entropy of lithiation during discharge of the material heat treated at 2600° C.

Figure 11:
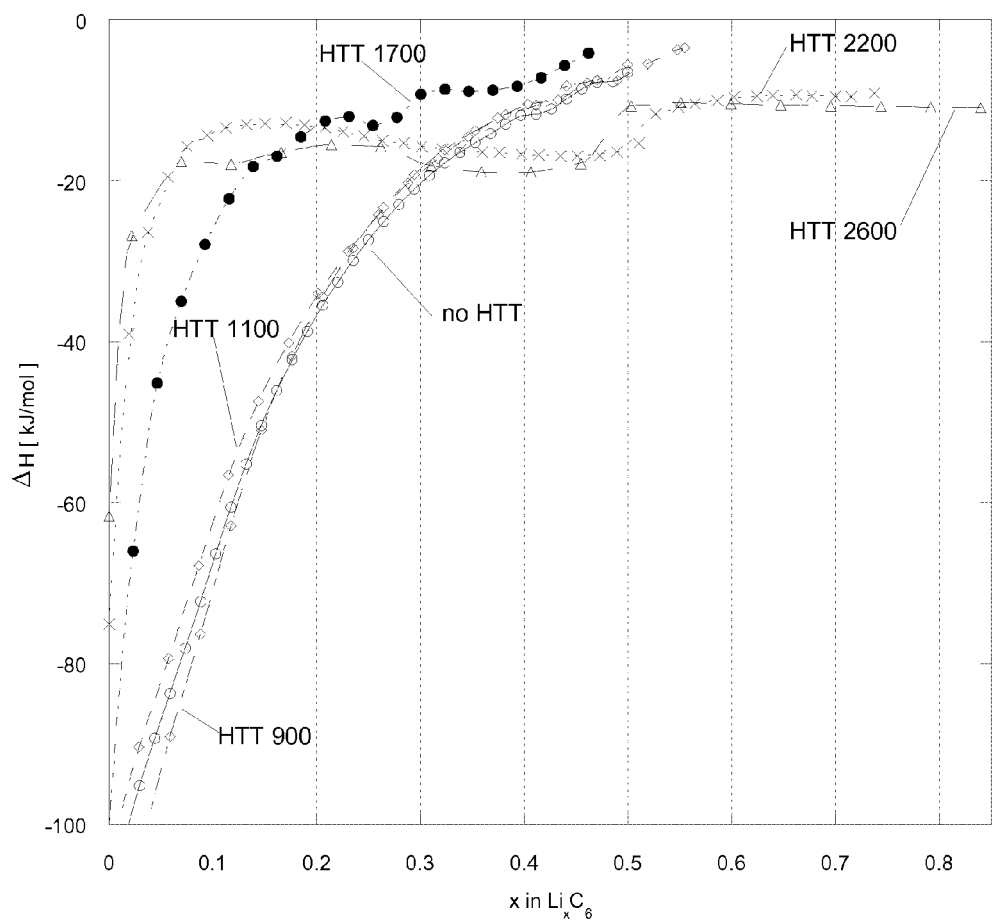

FIG. 11. Enthalpy of lithium intercalation for the five coke samples.

Figure 12:
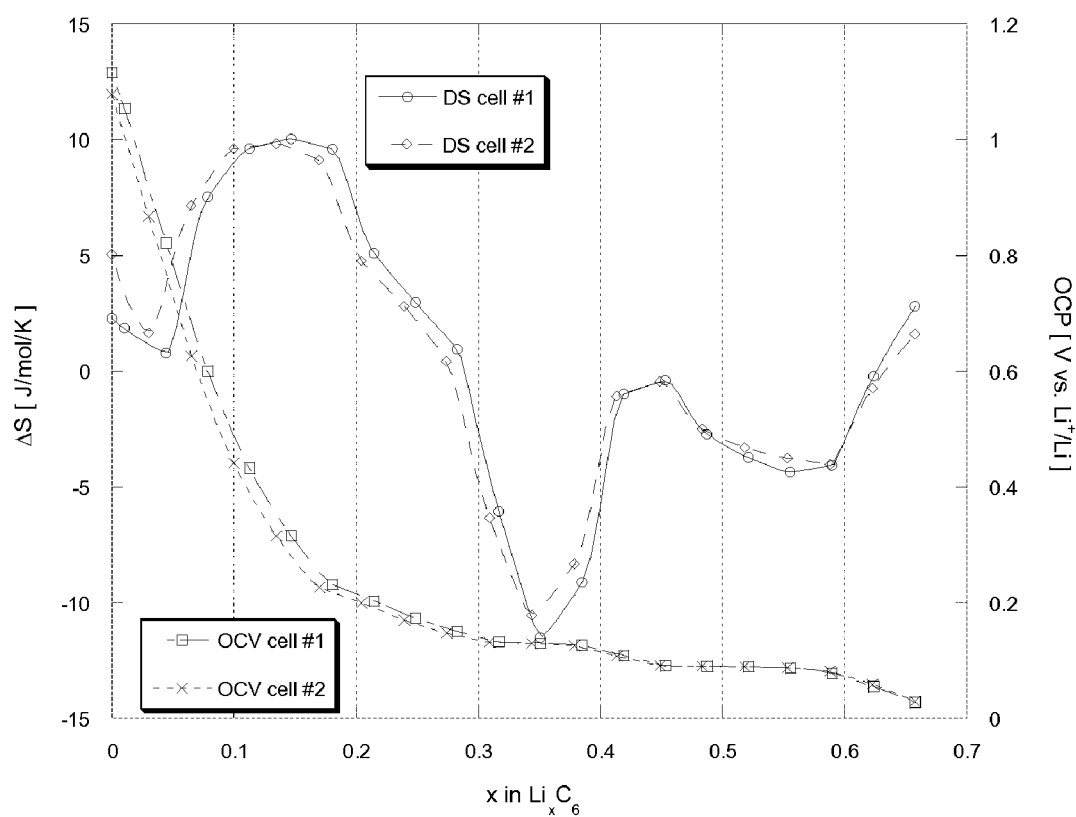

FIG. 12. Evolution of the entropy of intercalation and OCV for a mixture of 50% precursor material and 50% of material heat treated at 2600° C. (charge curve).

Figure 13:
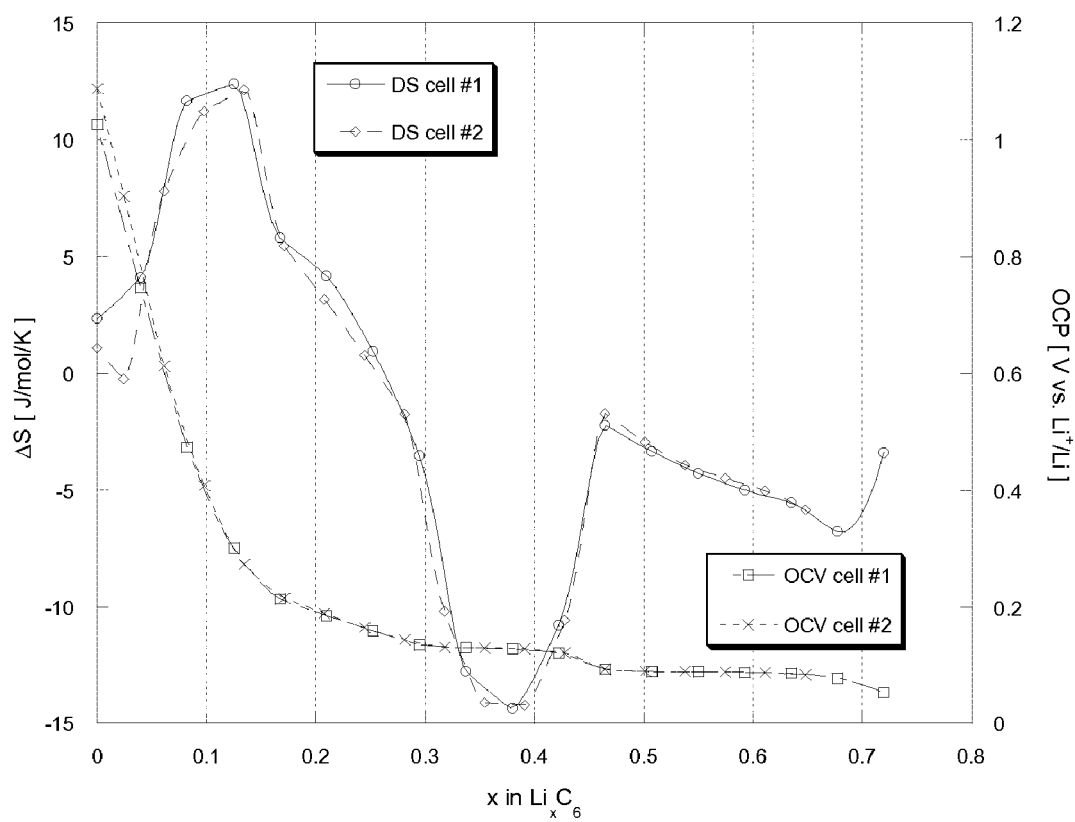

FIG. 13. Evolution of the entropy of intercalation and OCV for a mixture of 25% precursor material and 75% material heat treated at 2600° C. (charge curve).

Figure 14:
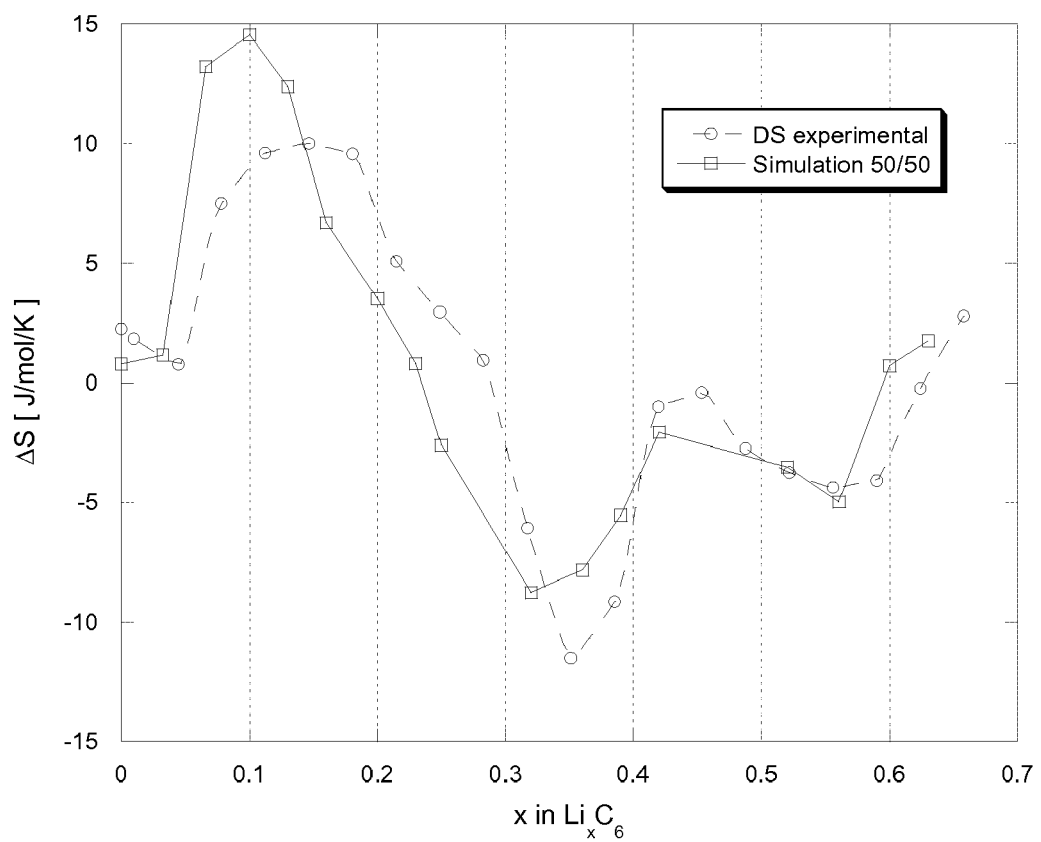

FIG. 14. Entropy of two composite electrodes made with 50% precursor material and 50% material heat treated at 2600° C., compared with the calculation of the entropy based on Equation E3 (α=0.50).

Figure 15:
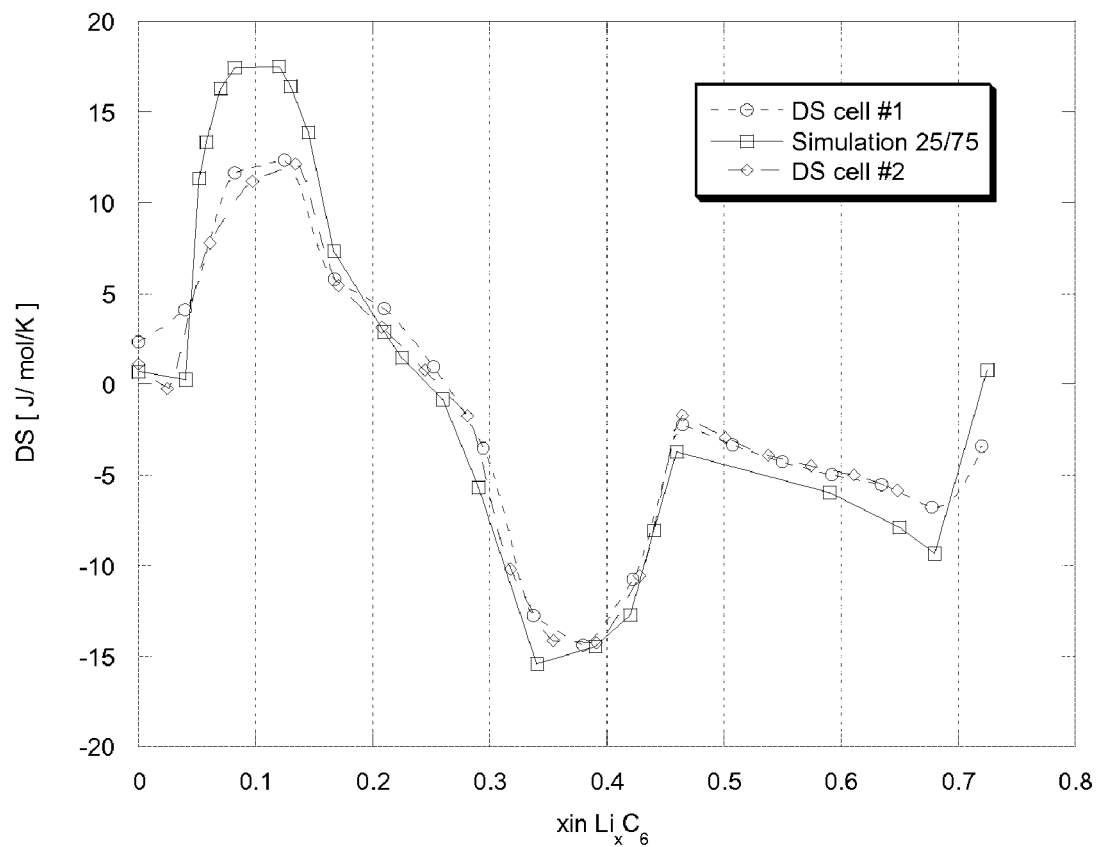

FIG. 15. Entropy of two composite electrodes made with 25% of precursor material and 75% material heat treated at 2600° C., compared with the calculation of the entropy based on Equation E3 (α=0.75).

Figure 16:
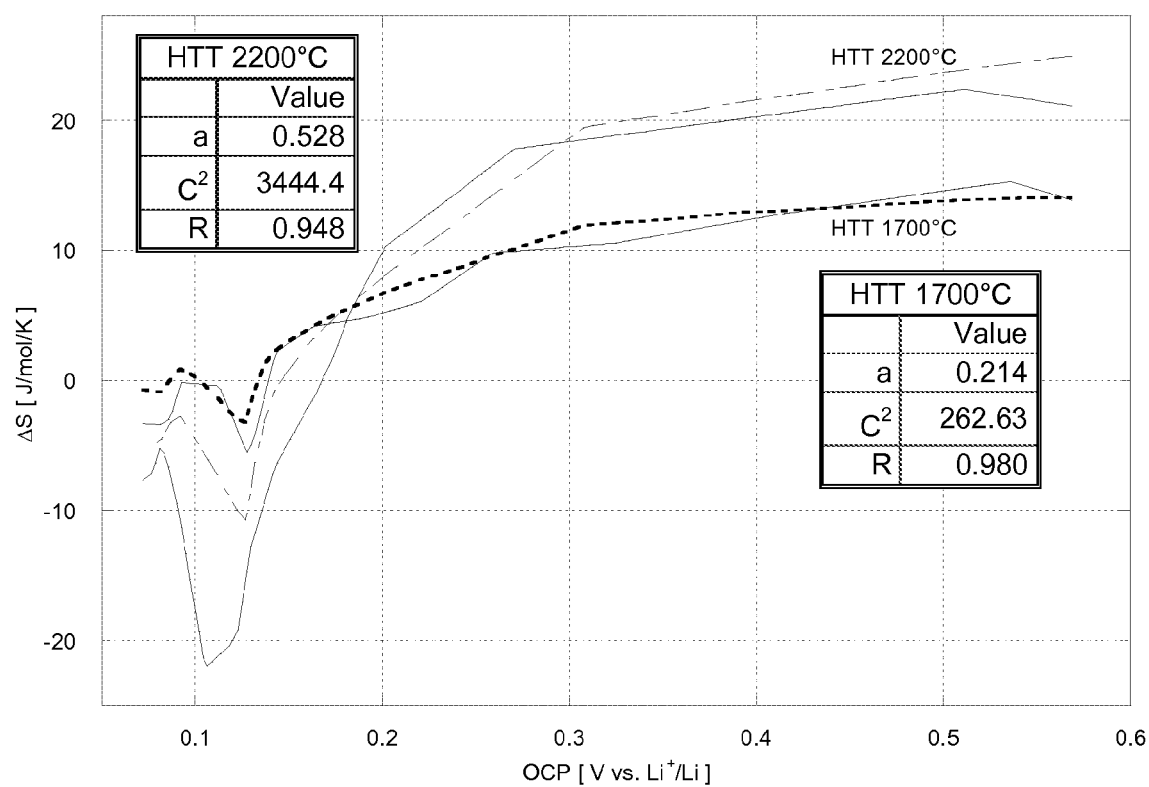

FIG. 16. Parametric plots of entropy curve versus OCV curve for two samples, heat treated at 1700° C. and 2200° C.

Figure 17:
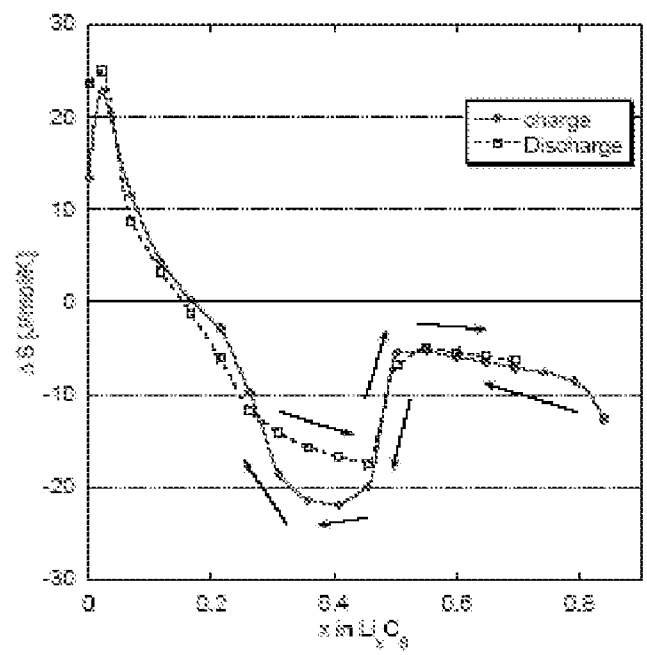

FIG. 17 FIG. 17 shows plots of changes in entropy (ΔS) of lithiation (i.e., entropy of lithium insertion) determined using the present electrochemical thermodynamics measurement system as a function of the composition of a coke anode (i.e, the stoichiometry with respect to intercalant). FIG. 17 provides entropy versus compositions curves for charge and discharge conditions.

Figure 18:
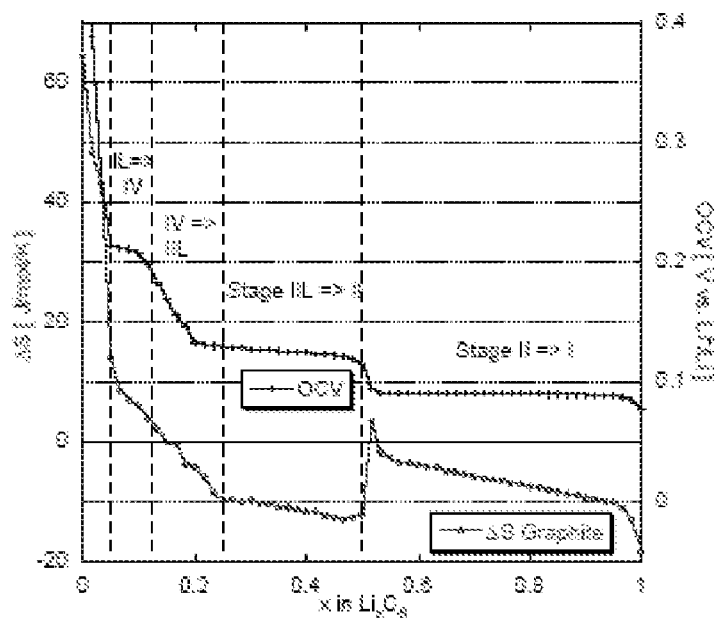

FIG. 18 shows plots of changes in entropy (ΔS) determined using the present electrochemical thermodynamics measurement system as a function of the composition of the anode (i.e, the stoichiometry with respect to intercalant). Also shown in FIG. 18 is the open circuit voltage as a function of composition.

Figure 19:
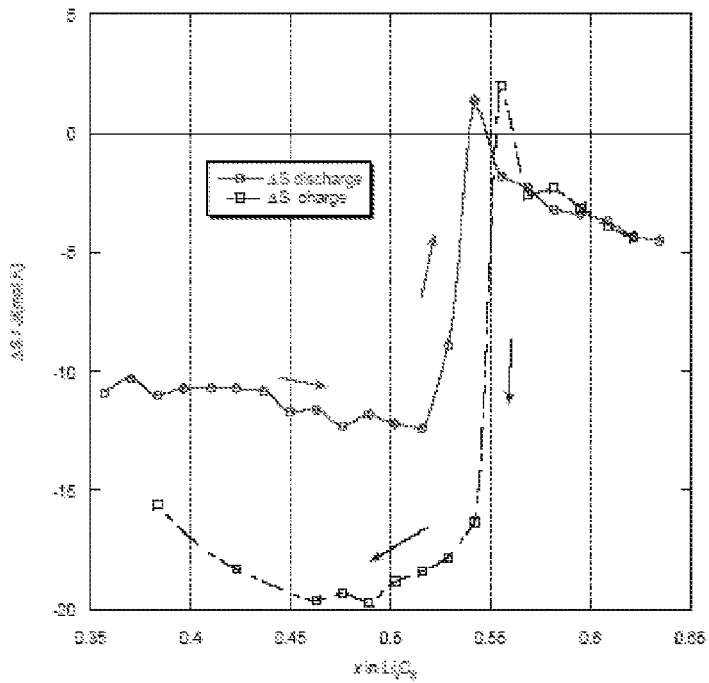

FIG. 19 provides plots of changes in entropy (ΔS) of determined using the present electrochemical thermodynamics measurement system as a function of the composition of a natural graphite anode that indicate entropy hysteresis at around x=0.5.

Figure 20:
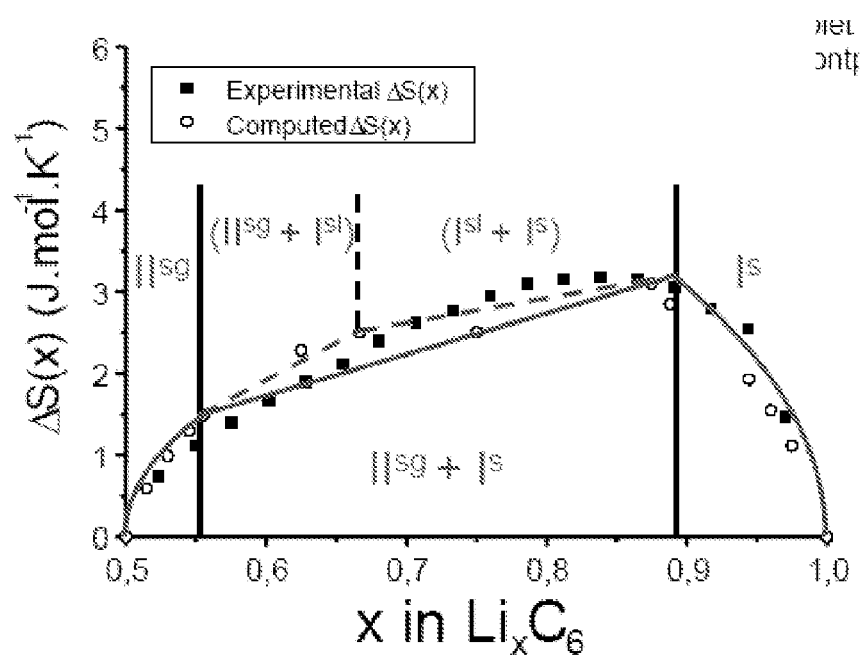

FIG. 20 provides experimentally determined ΔS values as a function of anode composition that provides phase diagram information for $Li_xC_6$. Also shown in FIG. 20 are computed ΔS values as a function of anode composition.

Figure 21:
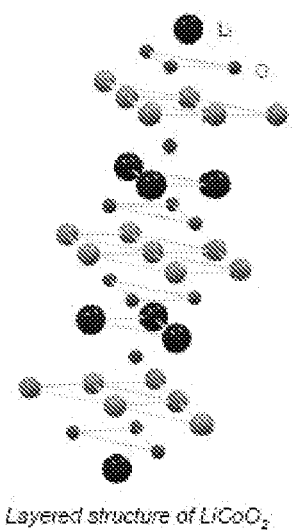

FIG. 21 shows the layered structure of $Li_xCoO_2$ cathode materials.

Figure 22:
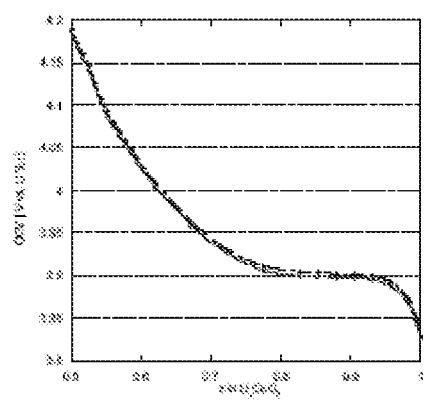
Figure 22:
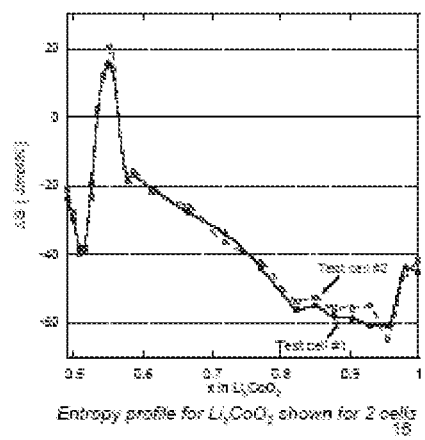

FIG. 22 provides plots of experimentally determined open circuit voltages (OCV) and changes in entropy (ΔS) for lithium insertion as a function of composition for a $Li_xCoO_2$ cathode. A comparison of the two plots shows that the entropy profile exhibits many more features that the OCV profile, highlighting application of the present systems and analysis methods for characterizing cathode materials.

Figure 23:
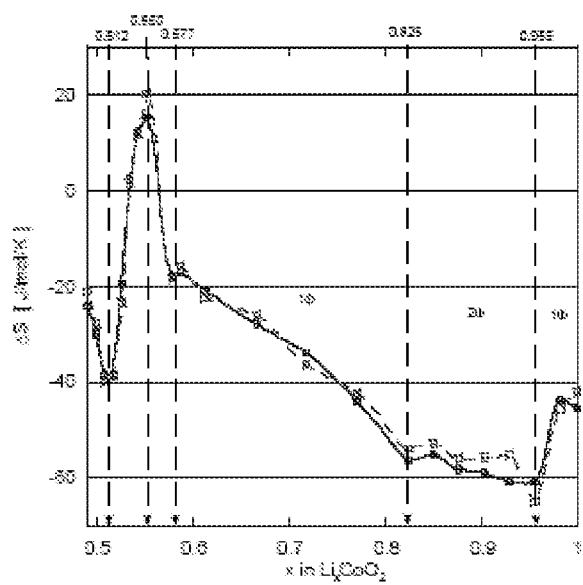

FIG. 23 shows an experimentally determined phase diagram in $Li_xCoO_2$.

Figure 24:
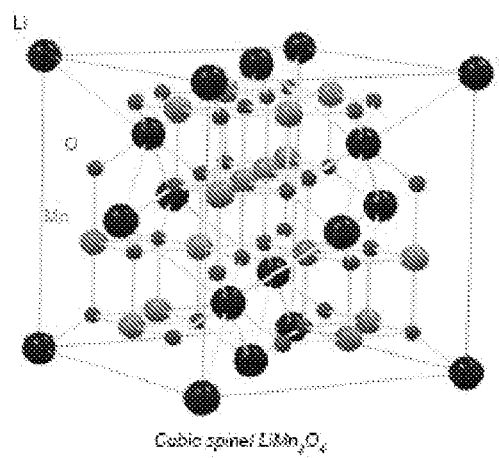

FIG. 24 shows the cubic spinel structure of $LiMn_2O_4$ cathode materials.

Figure 25A:
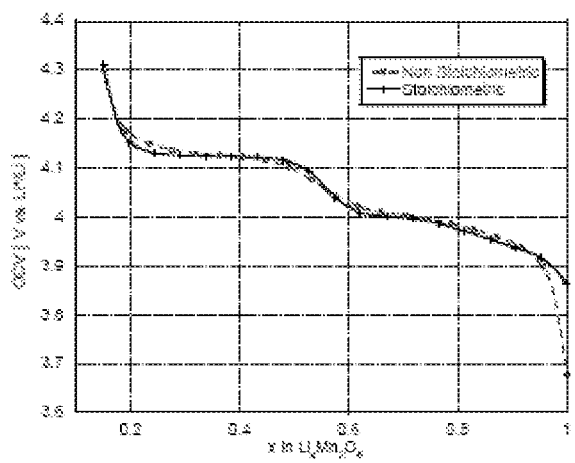
Figure 25B:
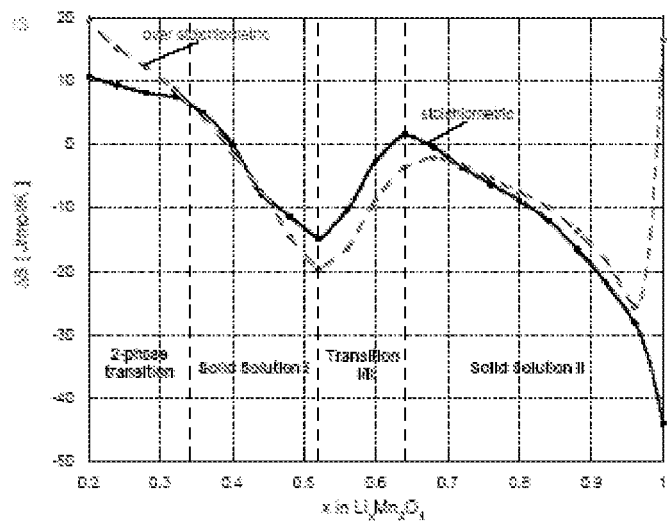

FIGS. 25A and 25B provides plots of experimentally determined open circuit voltages (OCV) and changes in entropy (ΔS) for lithium insertion as a function of composition for a $LiMn_2O_4$ cathode.

Figure 26A:
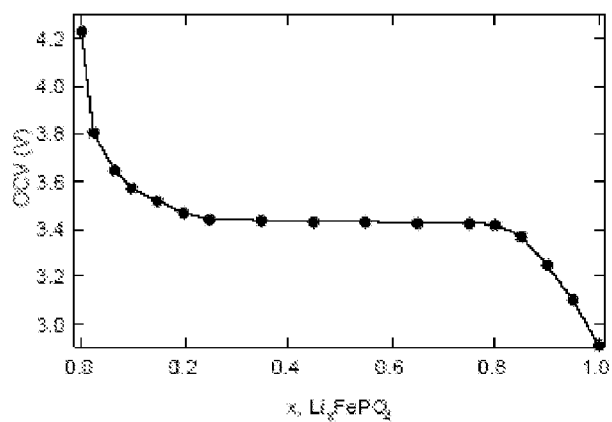
Figure 26B:
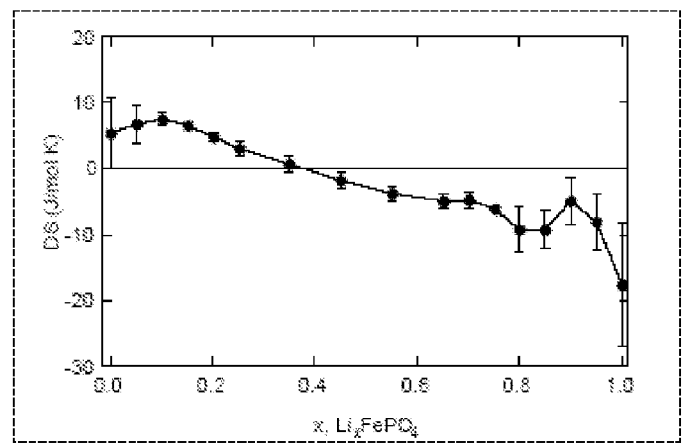

FIGS. 26A and 26B provides plots of experimentally determined open circuit voltages (OCV) and changes in entropy (ΔS) for lithium insertion as a function of composition for a $Li_xFePO_4$ cathode.

Figure 27:
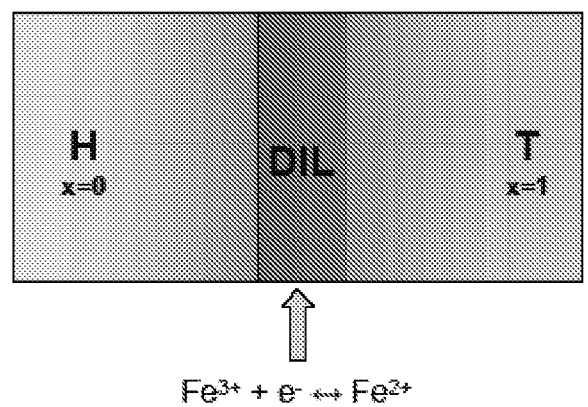

FIG. 27 shows a schematic illustrating the diffuse interphase layer model.

Figure 28:
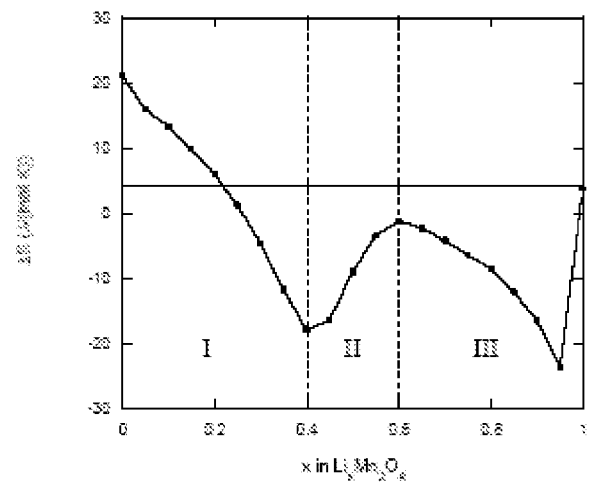

FIG. 28 provides a plot of experimentally changes in entropy (ΔS) for lithium insertion as a function of composition for a $LiMn_2O_4$ cathode.

Figure 29:
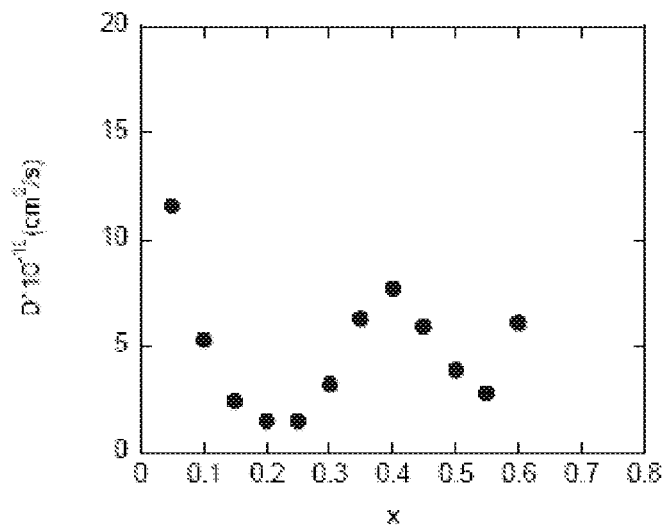

FIG. 29 provides a plot of diffusion coefficient ($D \times 10^{-10}$ cm$^2$ s$^{-1}$) as a function of composition of for a $LiMn_2O_4$ cathode.

Figure 30:
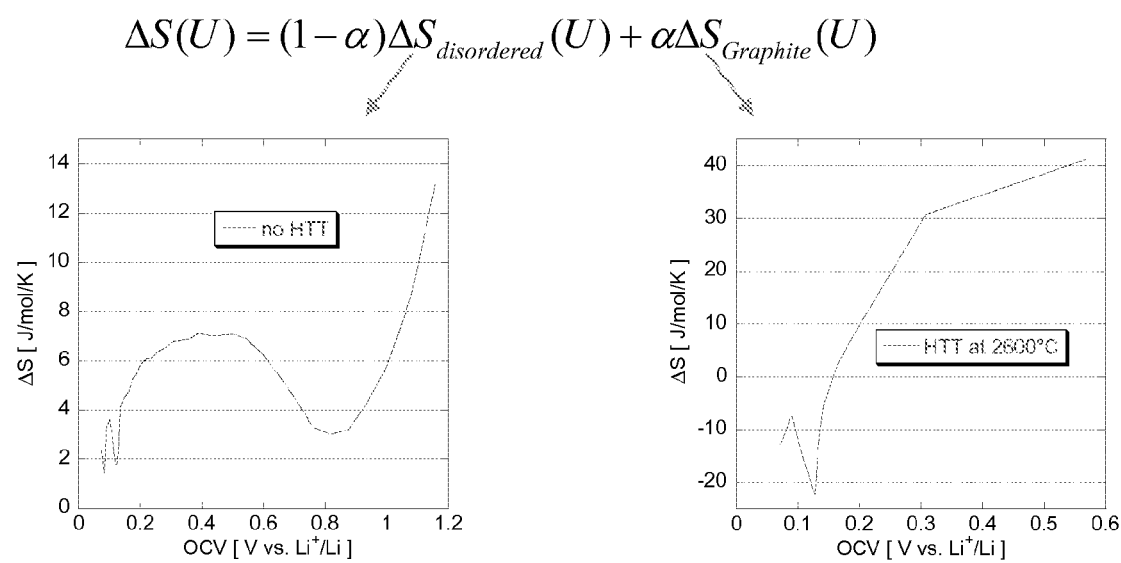

FIG. 30 provides plots of changes in entropy (ΔS) as a function of open circuit voltage for disordered carbon (left plot) and ordered, graphitic carbon (right plot).

Figure 31:
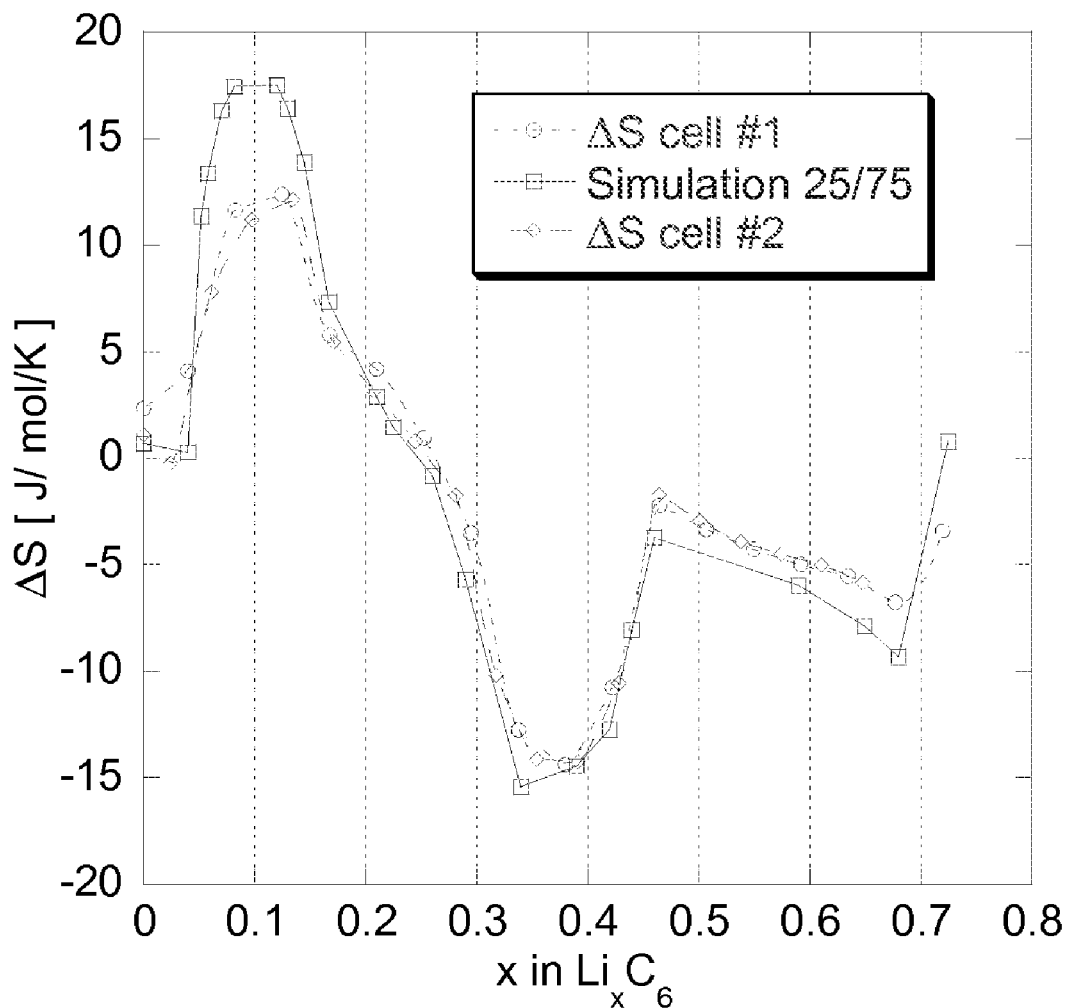

FIG. 31 provides a plot of changes in entropy (ΔS) as a function of open circuit voltage for an electrochemical cell having an electrode made with 25% of coke not exposed to high temperatures and 75% of coke exposed to high temperatures. Also shown in FIG. 31 are the results of simulations.

DETAILED DESCRIPTION OF THE INVENTION

Referring to the drawings, like numerals indicate like elements and the same number appearing in more than one drawing refers to the same element. In addition, hereinafter, the following definitions apply:

The term "electrochemical cell" refers to devices and/or device components that convert chemical energy into electrical energy or electrical energy into chemical energy. Electrochemical cells typical have two or more electrodes (e.g., cathode and anode) wherein electrode reactions occurring at the electrode surfaces result in charge transfer processes. Electrochemical cells include, but are not limited to, primary batteries, secondary batteries, galvanic cells, fuel cells and photovoltaic cells.

The term "open circuit voltage" refers to the difference in potential between terminals (i.e. electrodes) of an electrochemical cell when the circuit is open (i.e. no load conditions). Under certain conditions the open circuit voltage can be used to estimate the composition of an electrochemical cell. The present methods and system utilize measurements of open circuit voltage for thermochemically stabilized conditions of an electrochemical cell to determine thermodynamic parameters, materials properties and electrochemical properties of electrodes, electrochemical cells and electrochemical systems.

The term "capacity" is a characteristic of an electrochemical cell that refers to the total amount of electrical charge an electrochemical cell, such as a battery, is able to hold. Capacity is typically expressed in units of ampere-hours.

The expression "state of charge" is a characteristic of an electrochemical cell or component thereof (e.g. electrode—cathode and/or anode) referring to its available capacity, such as a battery, expressed as a percentage of its rated capacity.

The present invention provides methods and systems for thermodynamically evaluating electrochemical systems and components thereof, including electrochemical cells such as batteries, fuel cells and photovoltaics. The present systems and methods are capable of establishing selected electrochemical cell conditions, such as temperature and composition, and carrying out measurements of a number of cell parameters, including open circuit voltage, time and temperature, with accuracies large enough to allow for precise determination of thermodynamic state functions and materials properties relating to the composition, phase and electrochemical properties of electrodes and electrolytes in an electrochemical cell. Thermodynamic measurement systems of the present invention are highly versatile and provide information for predicting a wide range of performance attributes of for virtually an electrochemical system having an electrode pair.

To demonstrate the components, performance and functionality of the present systems and methods, entropies and enthalpies of lithium intercalation into various materials is examined using an electrochemical thermodynamics measurement system (ETMS) of the present invention. First, a background explanation is provided establishing the relationships between experimental measurements provided by the ETMS and important thermodynamic parameters which govern important electrochemical properties of the electrode. Second, a description of the components of the ETMS is provided. Third, example data is shown and analysis methods of the present invention are demonstrated which are used to determine thermodynamic parameters useful for characterizing intercalating electrode materials and predicting electrochemical performance.

To determine the evolution of the entropy and enthalpy of lithium intercalation into a material $Li_xM$ as a function of x, the temperature dependence of the open circuit voltage is examined using the present invention. This voltage is related to the Gibbs free energy of reaction by the thermodynamic identity:

$$\Delta G = -nFU \quad (4)$$

where U is the equilibrium potential of the electrode and F the Faraday number. For the $Li^+/Li$ electrochemical couple one electron is exchanged, so n=1.

The partial molar enthalpy, $\Delta H$, and entropy, $\Delta S$, of the lithium intercalation reaction are derived with respect to the amount of charge passed. In the following, $\Delta H$ and $\Delta S$ are assumed independent of temperature. Since the measurements are made between 5° C. and room temperature, this assumption is reliable as long as there are no phase transitions in this temperature range. Such is for instance the case for lithium cobalt oxide at the composition $Li_{0.5}CoO_2$, where a slight temperature change triggers the monoclinic to hexagonal phase transition close to room temperature.

The values measured are partial molar variables. From the first law of thermodynamics relating the internal energy of the system E to the work W and heat dissipated Q, the differential of the enthalpy can be obtained:

$$dE = \delta W + \delta Q \quad (5)$$
$$= -PdV + \mu dn + TdS$$

-continued
$$dH = dE + PdV + VdP \quad (6)$$
$$= \mu dn + TdS + VdP$$

with $\mu$ the chemical potential of the cathode referred to the metallic lithium anode, and n the number of lithium atoms exchanged. The term $\mu dn$ is the electrical work of the charge exchanged. In this study the pressure P is constant, so the third term, VdP, is neglected. Using (6) the Gibbs free energy can then be written as:

$$dG = dH - TdS - SdT \quad (7)$$
$$= \mu dn - SdT$$

To get molar values we use x=n/N, where N is the Avogadro's number. The chemical potential is related to the open circuit voltage U by $\mu = -eU$ where e is the charge of the electron.

$$dG = -NeUdx - SdT \quad (8)$$
$$= -FUdx - SdT$$

Since F=Ne. Then using Maxwell's relation for mixed second derivatives, we get the partial molar entropy of lithium intercalation as a function of the open circuit voltage:

$$\frac{\partial S}{\partial x}\bigg|_T = F\frac{\partial U}{\partial T}\bigg|_x = \Delta S \quad (9)$$

Since by definition H=G+TS we find:

$$\frac{\partial H}{\partial x}\bigg|_T = \frac{\partial G}{\partial x}\bigg|_T + T\frac{\partial S}{\partial x}\bigg|_T \quad (10)$$
$$= N\frac{\partial G}{\partial n}\bigg|_T + TF\frac{\partial U}{\partial T}\bigg|_x$$

By definition $(\partial G/\partial n)_T$ is the chemical potential $\mu = -eU$. We thus obtain the partial molar enthalpy of lithium intercalation as a function of the open circuit voltage, U:

$$\frac{\partial H}{\partial x}\bigg|_T = -FU + TF\frac{\partial U}{\partial T}\bigg|_x = \Delta H \quad (11)$$

It must be noted that $\mu = \mu_c - \mu_a$, is the difference of chemical potential between the cathode and the anode. As a consequence all our results are referred to the lithium anode, for which the chemical potential is supposed to be a constant at different states of charge.

Figure 1:
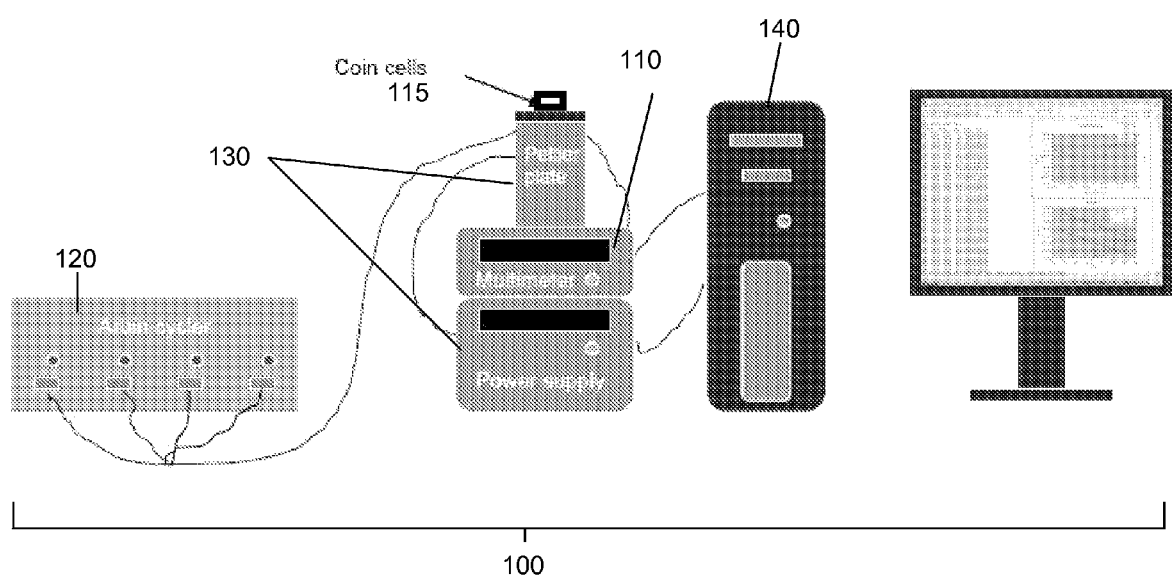
FIG. 1. provides a schematic diagram of a electrochemical thermodynamic measurement system of the present invention.

FIG. 1 provides a schematic diagram of an electrochemical thermodynamic measurement system for thermodynamically evaluating an electrochemical cell. As shown in FIG. 1, electrochemical thermodynamic measurement system 100 comprises: (i) a means 110 for measuring open circuit voltages of the electrochemical cell 115 as a function of time, (ii) a composition controller 120 electrically connected to the electrochemical cell; (iii) a temperature controller 130 in thermal contact with the electrochemical cell for establishing a plurality of selected electrochemical cell temperatures for each of the selected compositions; and (iv) an open circuit voltage analyzer 140 for receiving open circuit voltage measurements as a function of time from the means for measuring open circuit voltages and for identifying open circuit voltages for thermochemically stabilized conditions. In the embodiment shown in FIG. 1, electrochemical cell 115 is a coin cell, means 110 for measuring open circuit voltages is a digital multimeter electrically connected to the electrodes of the electrochemical cell 115, composition controller 120 is an Arbin BT4+ battery test instrument electrically connect to the electrochemical cell 115 such that is capable of charging or discharging the electrochemical cell 115 to a desired composition. Temperature controller 130 is a combination of a Peltier plate thermoelectric cooler, power supply, thermocouples in thermal contact with the Peltier plate and electrochemical cell 115 and feedback temperature control processor. These components were assemble such that temperature controller 130 is capable of establishing and maintaining a range of selected electrochemical cell temperatures. Open circuit voltage analyzer 140 is a processor capable of executing an algorithm for determining open circuit voltages for thermodynamically stabilized conditions.

Two temperature control setups are exemplified in this description. In the some experiments, temperature cycle was controlled manually using a Boekel Peltier cooler. Two batteries (to ensure reproducibility) were first discharged to a given voltage, corresponding to the desired insertion composition x. The cells were then isolated in a plastic bag and put in contact with the Peltier plate. Several temperature steps, usually five, were made. They comprised a temperature ramp followed by a temperature plateau until the open circuit voltage reached equilibrium. This cycle took approximately thirty minutes for each temperature. The temperature was controlled at ±0.5° C., and measured with a Chromel-Alumel thermocouple. Voltage was monitored with a National Instruments Lab-PC-1200 card within a 0.1 mV precision.

In other experiments the apparatus used is that show in FIG. 1 and the whole process was computer controlled. A program written in Visual Basic for Applications was developed to control an Agilent 3633 power supply which provided current to a Peltier plate in order to make the temperature steps. For that purpose a proportional-integral-derivative (PID) algorithm was chosen to get a fast temperature variation without overshoots. The program also controlled the data acquisition of the open circuit voltage of up to four cells along with their temperatures. An Agilent 34970 6.5-digit multimeter accurate to 10 µV was used for that purpose. Two RTD elements accurate to 0.1° C. were attached to the plate and to the cells to monitor their temperatures. The temperature of the plate was used to control the feedback loop of the power supply whereas the cell temperature was acquired to calculate the thermodynamic parameters. A four channel Arbin BT4+ discharged or charged the test cells to a chosen composition, and then they were allowed to equilibrate for usually four hours before the temperature cycle was launched automatically.

The alarm output of the multimeter sending a voltage step to the auxiliary channels of the Arbin, made it possible to start the discharge on demand from the Visual Basic program. About 600 data points were acquired during each temperature cycle, which lasted two and a half hours. It takes about six days to collect twenty points over the full composition range using intermittent 30 minute C/10 discharges, and steps corresponding to $\Delta x=0.05$. The temperature range was chosen to minimize the self discharge effects occurring at higher temperatures.

FIG. 2A illustrates one of the temperature cycles for a cell at a state of charge corresponding to x=0.2. It can be seen that the open circuit voltage is different at the beginning and the end of the measurement. This can be explained by the self discharge and/or potential drop due to side reactions and non-equilibrium conditions during the experiment. To correct for this error, the voltage drift plotted as a dashed line on was subtracted from the experimental data.

FIG. 2B provides a linear regression of the OCV vs. T for a graphite at x~0.2. The linear slope of the voltage as a function of temperature gives $\Delta S$ through equation (9). Equation (8) shows that $\Delta H$ can be calculated with the y-intercept of the open circuit voltage U vs. temperature, obtained from a linear regression (FIG. 2B). Note in this case the excellent linear behavior of the U(T) curve, with $R^2=0.9996$.

For ordered materials like graphite or lithium cobalt oxide, the fit is always very good, since the structure at a certain composition is usually well defined, and the entropy value was large (on the order of 10 J/mol/k). On the other hand for disordered compounds the quality of the linear regression is sometimes less perfect.

The simplest case that can be considered to get an idea of the entropy evolution is the entropy of mixing for an ideal solid solution. With this model, only the configurational entropy is considered. Starting from the Boltzmann definition of entropy:

$$S = k \ln \Omega \quad (12)$$

Assuming a completely random process for the intercalation of n lithium on a lattice containing N identical sites, equation (12) transform to:

$$S = k\ln\left(\frac{N!}{n!(N-n)!}\right) \quad (13)$$

Since N and n are large numbers, on the order of the Avogadro's number, Stirling's approximation can be used ($\ln N! \sim N \ln N - N$) and S becomes:

$$S = k(N\ln N - n\ln n - (N-n)\ln(N-n)) \quad (14)$$

$$S = k((N-n+n)\ln N - n\ln n - (N-n)\ln(N-n)) \quad (15)$$

$$S = -k\left(n\ln\frac{n}{N} + (N-n)\ln\frac{N-n}{N}\right) \quad (16)$$

Then by setting x=n/N it follows that:

$$S = -kN(x \ln x + (1-x)\ln(1-x)) \quad (17)$$

Finally differentiating with respect to the composition x, the partial molar entropy of the lithium intercalation reaction can be obtained:

$$\Delta S = \left.\frac{\partial S}{\partial x}\right|_{T,P} = R\ln\left(\frac{1-x}{x}\right) \quad (18)$$

where R is the perfect gas constant if N is taken as a mole. Equation 18 can be generalized for an ordering process taking place between compositions $x_1$ and $x_2$ ($x_1 < x < x_2$) and becomes:

$$\Delta S = R \ln\left(\frac{x_2 - x}{x - x_1}\right) \quad (19)$$

In fact other sources of entropy can be present, such as vibrational, electronic or magnetic, and the interpretation becomes more complex when the intercalation reaction takes place on sites having a range of different energies, leading to succession of entropy increases and decreases. Also, when a first order transition occurs an entropy plateau is expected, by virtue of the Gibbs phase rule.

EXAMPLE 1

Evolution of Lithiation Thermodynamics with the Graphitization of Carbons

Abstract

Instrumentation is provided for the study the thermodynamics of lithium intercalation in cokes that were heat treated at different temperatures. The method measures the open circuit voltages of electrochemical cells as a functions of temperature, and obtains the entropy and enthalpy of the lithiation reaction. X-ray diffractometry and Raman spectroscopy were used to determine the structure of the carbon materials after heat treatment. The effect of the degree of graphitization on the entropy and enthalpy of lithium intercalation was thereby determined. A model is proposed to correlate the degree of graphitization to entropy profiles. It is shown that graphs of entropy versus open circuit voltage for different states of charge give quantitative information on graphitization, making them useful for the structural characterization of partially-graphitized carbons.

Introduction

Carbonaceous materials, especially graphite, are the active materials in most anodes of commercial rechargeable lithium batteries. The crystallinity and defect structures in these materials affect the lithium intercalation reaction, altering the cyclability, stability, and rate capability of the battery. In the present work, a series of cokes subjected to various heat treatment temperatures were prepared for a systematic study of the effect of graphitization on the thermodynamics of lithium intercalation.

In previous work we showed that curves of the entropy and enthalpy of the lithiation reaction vary greatly between graphite and disordered carbons. This is perhaps expected because the structures of these two carbonaceous materials are very different. The long-range order of graphite accommodates lithium up to $LiC_6$, and the lithiation reaction occurs in stages with the formation of different orderings of lithium atoms. The entropy curves consequently show several distinct regions with plateaus, typical of first order phase transitions. On the other hand, the mechanism of lithium insertion into carbonaceous materials is not well understood.

Our previous work showed that measurements of the entropy and enthalpy differed between graphite materials subjected to different processings, and some sources of entropy could be identified in the curves of entropy versus state of lithiation. The present Example is focused on carbonaceous materials with low and intermediate degrees of graphitization. It is shown that graphs of entropy versus open circuit voltage at different states of charge can be used to deduce the degree of graphitization of the carbonaceous materials. These thermodynamics results are at least as sensitive to structural changes in partially-graphitized carbons as are x-ray diffractometry and Raman spectrometry.

Experimental

A series of coke samples was provided by Superior Graphite Co. (Chicago, Ill., USA). Along with the precursor that had undergone no heat treatment, materials were obtained after heat treatments at 900° C., 1100° C., 2200° C. and 2600° C. under an argon atmosphere. The average particle size was 30 microns. A petroleum coke heat treated at 1700° C. (provided by Carbone Lorraine, Aubervillier, France) was also studied. Composite electrodes were made by casting a slurry composed of 85% active material and 15% PVDF dissolved in acetone. No electronic binder was used because it could influence the thermodynamic measurements.

Coin cells of the CR2016 design were assembled in an argon-filled glove box. The electrolyte consisted on a molar solution of $LiPF_6$ in an EC:DMC (vol. 1:1) solvent mixture. The cells were first cycled five times with a rate of C/10 between 5 mV and 1.5V vs. Li to achieve a stable capacity. An automated thermodynamic measurement system (TMS) was the used to measure open circuit voltage versus temperature on pairs of cells with the same carbon material. A precision voltmeter (Agilent 34970, 10 µV resolution) measured the open circuit voltage while the cells were cooled with a Peltier plate controlled by a power supply. Six temperature steps were made with a 2° C. difference between each. Twenty minutes of equilibration was allowed for each step, which was confirmed to be enough time for the potential to stabilize. The temperature was measured with two RTD elements accurate to 0.1° C., one attached to the Peltier plate and the other to the test cell. Owing to the reasonable thickness of the cell and adequate thermal conductivities, the temperature of both RTD elements became equal a few minutes after each step. After each 6-step potential measurement, the composition was changed by a galvanostatic charge or discharge, and a rest time of four or eight hours was used before the next temperature cycle. The temperature dependence of the open circuit voltage was then reduced to the entropy and enthalpy of lithium intercalation at different states of charge.

Considering the high resolution of the instrumentation, a temperature range of 10° C. is sufficient to get accurate data while minimizing the chance of a temperature induced phase transition or a large change in electrochemical kinetics, for example. Going below room temperature minimizes self-discharge during the experiment, and the remaining voltage drift is automatically subtracted by measuring the voltage difference between the start of the experiment and two hours after termination. The lithium composition, x, is determined by using the current passed through the cell and the active mass to calculate the capacity, and then comparing it to the theoretical capacity of graphite (372 mAh/g).

X-ray diffraction (XRD) patterns were acquired with a Philips X'Pert diffractometer using the copper $K_\alpha$ x-rays. Ten percent of silicon powder was added to each sample to provide an internal reference and give an accurate peak position measurements. Raman spectra were acquired on a Renishaw micro Raman spectrometer using the 514.5 nm radiation of an argon ion laser. The spectral resolution was 1 $cm^{-1}$.

Results

X-ray diffraction patterns from the different materials are presented in FIG. 3. With increasing heat treatment temperature, there is a sharpening of the graphite 002 diffraction at about 2θ=26°. For temperatures of 2200° C. and higher, the 004 peak is visible at 2θ=54°. The presence of the 004 peak is indicative of higher crystallinity.

The materials heat treated at the three lowest temperature cannot be distinguished from their XRD patterns alone, as expected since graphitization treatments are not so effective for temperatures below 1000° C. The 101 diffraction peak of the rhombohedral phase can be seen near 45°, indicating that the crystalline domains of the cokes consisted of a mixture of hexagonal and rhombohedral graphite. Noteworthy is the shape of the 002 peak for the materials heat treated at low temperatures, where a sharp peak at 2θ=26.4° is present next to a broader peak at 25.7°. The sharp peak shows that well-graphitized domains are present even in these samples with low temperature heat treatments.

The degree of graphitization G was determined from the d-spacing of the 002 peaks, using the following formula:

$$G = \frac{3.461 - d_{002}}{3.461 - 3.352} \quad [E1]$$

where 3.461 Å is the d-spacing for a fully turbostratic disordered material, and 3.352 Å is the d-spacing of highly oriented pyrolytic graphite. The parameter G decreases with the proportion of turbostratic disorder, and is a measure of the degree of graphitization.

Some Raman spectra of the samples are shown in FIG. 4. Raman spectra can provide information on the disorder in the 'a' direction from the intensity ratio of the D band peak ($A_{1g}$ breathing mode) at 1355 cm$^{-1}$ and the G band peak ($E_{2g2}$ stretching mode) at 1590 cm$^{-1}$. The D band is caused by vibrations that occur only when the graphene planes are small, and indicate disorder in the carbonaceous material. The crystallite size in the 'a' direction, $L_a$, can be estimated with the equation suggested by Tuinstra et al.:

$$L_a = \frac{4.3}{R} \quad [E2]$$

with R defined as the ratio of the integrated intensity of the D and G peaks.

With increasing temperature of heat treatments, there is a decrease in intensity of the D band peak, and the G band peak becomes sharper, while shifting downward. The calculated $L_a$ versus temperature is presented in FIG. 5, and is compared to the $L_c$ values obtained by XRD. The values found for $L_a$ are similar to those determined for $L_c$ from x-ray diffractometry, and confirm the increase in size of crystallites for heat treatments above 1500° C. Below this temperature, $L_a$ and $L_c$ both have a value of about 4 nm. The size of the crystalline domains increases rapidly with heat treatment temperature, reaching about 65 nm at 2600° C. X-ray lineshape analysis is only qualitative after crystallite sizes exceed 40 nm, however.

FIG. 6 shows the entropy profile of the precursor material with no heat treatment, and the open circuit voltage (OCV) curve for the same material. These data were recorded during charging of the cell (increasing voltage), using eight hours rest before each temperature cycle. Charging was performed at a C/20 rate. The OCV curve has a shape typical of samples with lower temperatures of heat treatments: it decreases steadily with concentration, and the potential is high compared to graphite, exceeding 1 V vs. Li$^+$/Li, and decreases below 0.2 V only at the end of lithium insertion. The entropy curve has several visible features. After a sharp drop for compositions below x=0.1, it increases and makes a plateau between x=0.2 and 0.4. It then decreases to 1 J/mol/K, and finally increases at the very end of insertion.

The entropy curves for lithiation of the three materials with lower temperature heat treatments are presented in FIG. 7. Profiles for the precursor material, and materials heat treated at 900° C. and 1100° C. look similar, apart from the region above x=0.4. The capacity of these compounds, about 200 mAh/g, is low compared to graphite but seems to increase a bit with heat treatment.

For heat treatments at higher temperatures, some typical features of ordered graphite appear in the entropy curve and the OCV curve. FIG. 8 shows the entropy and OCV curves for a coke heat treated at 1700° C.: the potential first drops, and makes two sloping plateaus, hinting at staging. A plateau is also visible in the entropy for x between about 0.3 and 0.5 after an initial peak around x=0.05, and the curve decreases for lithium concentrations up to x=0.25.

With a heat treatment temperature of 2200° C., the material develops a high degree of crystallographic order. Large graphene planes form and can accommodate lithium in staged reactions. This is seen in FIG. 9 where the sharp entropy step at x=0.5 is indicative of the formation of a stage one compound. The capacity is greatly improved by this heat treatment, reaching 275 mAh/g.

Finally, the coke sample with highest heat treatment temperature of 2600° C. had the highest capacity of our materials, 316 mAh/g. The OCV and entropy curves (FIG. 10) of this sample are similar to those of natural graphite. The rise of the entropy at the lowest x does not originate from lithium intercalation in the material under study, but rather some other electrochemical couple at high potential above 0.5V vs. Li$^+$/Li, perhaps from lithium adsorption on the surfaces of disordered carbonaceous domains, which may occur prior to intercalation. After the entropy curve decreases rapidly with x below x=0.1, it becomes negative and slowly levels off at approximately x=0.3. The sharp increase near x=0.5 can be seen in the data from the sample heat treated at 2200° C. Finally the entropy curve makes a semi-plateau around −8 J/mol/K until the full capacity is reached, then begins to fall faster.

The enthalpies of lithiation for the six samples are presented in FIG. 11. For the precursor material, and materials heat treated at the low temperatures of 900° C. and 1100° C., the enthalpy curve mirrors the OCV profiles, because the entropy term in the free energy, TS, is small compared to the average value of enthalpy. This is not the case for the heat treatments at higher temperatures. After a rapid increase, ΔH makes a first peak around x=0.15 and then shows two plateaus. These plateaus can be related to staging, much as for the entropy profiles.

Discussion a) Analysis of the Entropy Profiles

The enthalpy and entropy curves are greatly influenced by the degree of graphitization, G. Upon a first examination, there seems to be no obvious transition in the shapes of curves for the group of samples with heat treatments at low temperatures and those at high temperatures. This apparent issue is one of data presentation. Comparing curves based on composition, x, does not account for the fact that the inserted sites do not depend on x, but rather on the potential at which the sites become active. Above 0.2 V vs. Li$^+$/Li, the intercalation sites between well-ordered graphene layers are not electrochemically active. This voltage region corresponds to most of the capacity of disordered cokes.

Many theories have been proposed to explain the mode of lithium storage for partially-graphitized carbon materials.

Some proposed that lithium could bind covalently with hydrogen at the small graphene plane edges, since these materials heat treated at low temperatures are known to have a high content of hydrogen. Using NMR evidence, Mori et al. postulated the existence of two types of lithium insertion sites, some between graphene planes and others at the surfaces of crystallites, or between them. Another model, called the 'house of cards' model, proposes that single-layer graphene fragments are stacked randomly, and lithium is adsorbed on both sides of graphene sheets. Mabuchi et al. proposed a model involving clusters of metallic lithium atoms forming in cavities and pores. In our case this last possibility seems unlikely, since the clustered lithium atoms would be nearly metallic, and should contribute an extra capacity above $x=0.5$. They would be inserted at a potential close to 0V vs. $Li^+/Li$, but this is not observed.

Carbons heat treated at low temperatures below 1100° C. consist of turbostratically disordered graphene planes of different shapes and sizes. For lithium insertion, these materials have a wide range of sites of different energies, resulting in a sloping OCV curve. The change of insertion sites can be seen on potential relaxation curves. The equilibration time after intermittent de-lithiation of a coke with no heat treatment is shorter for potentials below 0.2 V than for potentials between 0.2 and 1 V, indicating differences in kinetic processes.

By applying this interpretation to FIG. 6, it appears that above about $x=0.33$ the sharp drop in entropy could come from the intercalation of lithium into crystallites of ordered graphite. By analogy with graphite it may be possible that the increase in the entropy curve at larger x may occur after embryos of a lower stage nucleate from the domains of higher staging. The rapid decrease of the entropy curve at small x can be explained by the concentration-dependence of the entropy of mixing. Filling the first available sites in a solid solution causes the entropy of lithiation to change rapidly. From $x=0.15$ to $x=0.33$, the wide energy distribution of the available sites causes the entropy to be almost zero, since a lithium atom can select only a small number of equivalently-favored sites. As a result the partial entropy of insertion should be zero, and the nearly constant value of about 5.5 J/mol/K could be explained by the difference of electronic or vibrational entropy between lithium in the metallic anode and the carbonaceous cathode. (Proving this hypothesis would require information on the phonon or electronic entropy of lithiation for disordered carbons.)

At higher temperatures of heat treatment, the region above $x=0.33$ shows more features. This is consistent with the graphitization process, which should make more graphitic sites available below 0.2 V. It is difficult however to attribute the successive peaks in the $\Delta S(x)$ curves of FIG. 7 to particular staging transitions. The entropy curve for the material heat treated at 1700° C. is interesting because it constitutes an important link between the behaviors of materials with low and high temperature heat treatments. The electrochemical capacity of the material heat treated at 1700° C. is low, even compared to the carbons with heat treatments at lower temperatures. The hydrogen content decreases rapidly in the temperature range from 750° C. to 1500° C., starting at about 10% hydrogen atoms below 750° C. and falling to less than 0.5% for heat treatments above 1500° C. Fewer sites are consequently available for lithium bonding, but the long range order of graphite is not yet attained, resulting in a low capacity. The OCV curve for the material heat treated at 1700° C. (FIG. 8) shows two kinds of behaviors, with a sloping decrease of potential at low x, followed by two plateaus from intercalation between graphene planes as stage 2 and then stage 1 compounds are formed. This mechanism is confirmed in the entropy curve. For materials heat treated at low temperatures, at low lithium concentrations the entropy curve makes a peak, then decreases and becomes negative when the first plateau appears in the OCV. At x near 0.3, the entropy makes a step increase and reaches a plateau corresponding to stage 1 formation.

The materials heat treated at 2200° C. and 2600° C. do not show this dual behavior, but have features very similar to natural graphite. For these materials the only mode of lithiation is lithium intercalation. Their crystallinity is not as good as for natural graphite, however, so the capacity is somewhat lower.

b) A Two-phase Mixture Model

We model carbonaceous materials with intermediate degrees of graphitization as a mixture of graphitic and non-graphitic domains. This model suggests a fit of the entropy curves with reference curves from graphitic coke (heat treated at 2600° C.) and from disordered coke (no heat treatment). However, as pointed out in the previous section, the fit is not a linear combination of the curves based on composition x, but should be based on the OCV, which determines when a lithium insertion site becomes active. For any given potential U, the reference component entropy curves must be combined as:

$$\Delta S(U)=(1-\alpha)\Delta S_{noHTT}(U)+\alpha\Delta S_{HTT2600}(U) \quad [E3]$$

where $\Delta S$ is the entropy of the material, and $\alpha$ is the fraction of graphitic domains, assuming that the material heat treated at 2600° C. is fully graphitized.

To test this hypothesis, electrodes were prepared using different mixtures of precursor material with no heat treatment and material heat treated at 2600° C. First, equal amounts by weight of these two materials were mixed to make an electrode. The measured profiles are shown in FIG. 12. Both entropy and OCV curves look very similar to those of the material heat treated at 1700° C. (FIG. 8), suggesting that from the standpoint of the lithiation reaction, this material is composed of graphitic and disordered domains.

Another sample was prepared containing a mixture of 25 wt % of precursor material plus 75 wt % of material heat treated at 2600° C. As seen in FIG. 13, the capacity increases slightly while the stage-2 to stage-1 plateau of the OCV has a larger range than for the 50/50 sample. It is not surprising to see the curve appear closer to that of the sample heat treated at 2600° C. because the amount of graphitic material in the electrode was larger. The entropy curves of FIGS. 12 and 13 can be compared to the theoretical entropy curve obtained from Equation E3, with a equal to 0.5 and 0.75 respectively. FIG. 14 compares the entropy of lithium intercalation of a composite electrode made with 50% precursor material and 50% of material heat treated at 2600° C., with a calculation based on Equation E3 using the reference curves. The result from Equation E3 is in good agreement with experiment, although the entropy is a bit overestimated at low concentrations. The calculation with $\alpha=0.75$ is shown in FIG. 15, and is compared to electrodes made with 75% of material heat treated at 2600° C. There is a very good agreement between experiment and calculation, except again at low concentrations where the entropy is higher for the calculation. These results seem to validate the mixture model of Equation E3, suggesting that it can be used to determine the fraction of graphitic phase in cokes with different heat treatment temperatures.

The entropy curve was then plotted against the OCV curve for each material. These entropy vs. OCV plots for the precursor material and for the material heat treated at 2600° C.

were combined following Equation E3, and α was adjusted to fit similar curves obtained from samples heat treated at intermediate temperatures. Least squares fits for these entropy vs. OCV plots for the cokes heat treated at 1700° C. and 2200° C. are shown in FIG. 16. The regression coefficient for the material heat treated at 1700° C. is good. A value of 21% was obtained for α, close to the 30% graphitization obtained from XRD measurement of the 002 peak position. The degree of graphitization is higher for the material heat treated at 2200° C., for which α=53%, somewhat lower than the value of 77% from the XRD analysis. These values are encouraging and show a good trend, but it must be remembered that even the precursor material used as a reference contained some graphitic domains, thereby introducing an error in α. Likewise the material heat treated at 2600° C. was used as a reference curve for graphite, but it is not completely graphitized. The use of a coke heat treated at a higher temperature would improve the accuracy of the result. On the other hand, it might be difficult to find a good reference sample of disordered carbon, since these materials usually have poor electrochemical cyclability.

Conclusion

Measurements of open circuit voltage versus temperature were used to study the effect of graphitization on the thermodynamics of lithium intercalation into cokes. Partially graphitized materials show two distinct modes of lithium insertion: cokes subjected to low heat treatment temperatures have lithium insertion into a variety of sites with a wide distribution of energies. As the graphitization improves, lithium atoms intercalate into sites similar to those of graphite. The number of sites of the first type decreases as graphitization proceeds, which results in a mixed behavior for carbonaceous materials that are heat treated at intermediate temperatures. Experimental results indicate that these carbonaceous materials with intermediate graphitization differ primarily in the amounts of the two types of lithium sites, and the chemical potentials of these sites remain largely unchanged with graphitization. A new method for measuring the degree of graphitization is provided, based on this model.

TABLE 3

Crystallite size in the c-direction based on the 002 peak broadening, and degree of graphitization for materials with different heat treatment temperatures (HTT)

| Sample | Full width at half maximum FWHM (2θ) | d-spacing (Å) | 002 peak angle (2θ) | G (%) | $L_c$ (Å) |
| --- | --- | --- | --- | --- | --- |
| Coke no HTT | 1.97 | 3.461 | 25.72 | 0 | 43 |
|  | 0.37 | 3.372 | 26.41 | 82 | 277 |
| Coke HTT 900° C. | 1.93 | 3.461 | 25.72 | 0 | 44 |
|  | 0.35 | 3.372 | 26.41 | 82 | 297 |
| Coke HTT 1100° C. | 2.05 | 3.461 | 25.72 | 0 | 41 |
|  | 0.33 | 3.372 | 26.41 | 82 | 320 |
| Coke HTT 1700° C. | 0.58 | 3.428 | 25.97 | 30 | 160 |
|  | 0.23 | 3.359 | 26.51 | 94 | 523 |
| Coke HTT 2200° C. | 0.25 | 3.377 | 26.37 | 77 | 458 |
| Coke HTT 2600° C. | 0.20 | 3.361 | 26.50 | 92 | 643 |

EXAMPLE 2

Electrothermodynamic Characterization of Electrode Materials

The present methods and systems are useful for identifying and characterizing physical and chemical properties of a variety of electrode materials, including intercalating electrode materials. For example, analysis of thermodynamic parameters generated using the present methods and systems provide a very sensitive and quantitative means of probing the phase, morphology and presence of defects in electrode materials in electrochemical cells. This aspect of the present invention provides an attractive method for diagnosing candidate electrode materials prior to and after implementation in commercial batteries. To demonstrate this functionality of the present invention, a number of anode materials and cathode materials for lithium ion batteries were evaluated and characterized using the present measuring system and analysis methods.

FIG. 17 shows a plot of changes in entropy (ΔS) of lithiation (i.e., entropy of lithium insertion) determined using the present electrochemical thermodynamics measurement system as a function of the composition of a coke anode (i.e, the stoichiometry with respect to intercalant) during charge and discharge of coke HTT (HTT=exposed to conditions of heat treatment) at 2600 degrees Celsius. FIG. 17 provides entropy versus compositions curves for charge and discharge conditions. The profiles shown in FIG. 17 are very close to natural graphite. A hysteresis appears between charge and discharge conditions which possibly indicates that loading and unloading paths are different.

FIG. 18 provides a plot of changes in entropy (ΔS) of determined using the present electrochemical thermodynamics measurement system as a function of the composition of a natural graphite anode. Also shown in FIG. 18 is a plot of open circuit voltage as a function of anode composition. FIG. 18 shows the entropy of intercalation and OCV during insertion. FIG. 19 provides plots of changes in entropy (ΔS) of determined using the present electrochemical thermodynamics measurement system as a function of the composition of a natural graphite anode that indicate entropy hysteresis at around x=0.5. At x=0.45, a difference of nearly 7 J mol$^{-1}$K$^{-1}$ is observed.

FIG. 20 provides experimentally determined ΔS values as a function of anode composition that provides phase diagram information for Li$_x$C$_6$. Also shown in FIG. 20 are computed ΔS values as a function of anode composition.

FIG. 21 shows the layered structure of Li$_x$CoO$_2$ cathode materials. FIG. 22 provides plots of experimentally determined open circuit voltages (OCV) and changes in entropy (ΔS) for lithium insertion as a function of composition for a Li$_x$CoO$_2$ cathode. A comparison of the two plots shows that the entropy profile exhibits many more features that the OCV profile, highlighting application of the present systems and analysis methods for quantitative characterization of cathode materials. FIG. 23 shows an experimentally determined phase diagram in Li$_x$CoO$_2$.

FIG. 24 shows the cubic spinel structure of LiMn$_2$O$_4$ cathode materials. FIGS. 25A and 25B provides plots of experimentally determined open circuit voltages (OCV) and changes in entropy (ΔS) for lithium insertion as a function of composition for a LiMn$_2$O$_4$ cathode.

FIGS. 26A and 26B provides plots of experimentally determined open circuit voltages (OCV) and changes in entropy (ΔS) for lithium insertion as a function of composition for a Li$_x$FePO$_4$ cathode.

FIG. 27 shows a schematic illustrating a diffuse interphase layer model.

FIG. 28 provides a plot of experimentally changes in entropy (ΔS) for lithium insertion as a function of composition for a LiMn$_2$O$_4$ cathode.

FIG. 29 provides a plot of diffusion coefficient ($D \times 10^{-10}$ $cm^2 s^{-1}$) as a function of composition of for a $LiMn_2O_4$ cathode.

FIG. 30 provides plots of changes in entropy ($\Delta S$) as a function of open circuit voltage for disordered carbon (left plot) and ordered, graphitic carbon (right plot). The sample used to generate the plots in FIG. 30 correspond to coke samples that have not been exposed to high temperatures (left side) and coke samples that have been exposed to high temperatures (right side). Coke samples typically containing a mixture of graphitic and disordered carbon materials. As shown by a comparison of the left and right plots in FIG. 30, plots of changes in entropy ($\Delta S$) as a function of open circuit voltage are useful for characterizing the physical properties of electrode materials, for example for characterizing the degree of graphitization. For example, the plots of changes in entropy ($\Delta S$) as a function of open circuit voltage (or composition) may be fit to the equation shown in FIG. 30 to quantitatively determine the extent of graphitization in a coke sample:

$$\Delta S(U) = (1-\alpha)\Delta S_{disordered}(U) + \alpha \Delta S_{graphite}(U)$$

The equation above (and in FIG. 30) corresponds to a linear combination of entropy curves as a function of OCV for disordered and graphitic carbon. In this analysis the parameter $\alpha$, as shown in the equation in FIG. 30, corresponds to the extent of graphitization in the sample.

FIG. 31 provides a plot of changes in entropy ($\Delta S$) as a function of open circuit voltage for an electrochemical cell having an electrode made with 25% of coke not exposed to high temperatures and 75% of coke exposed to high temperatures. Also shown in FIG. 31 are the results of simulations. Entropy plots corresponding to a HTT 1700 degree Celsius coke sample and a HTT 1700 degree Celsius coke sample were fit to the equation above (and shown in FIG. 30) to yields values of $\alpha$ of 21% and 53%, respectively. Based on diffraction data (i.e., the 002 peak position) the extent of graphite in the HTT 1700 degree Celsius coke sample and the HTT 1700 degree Celsius coke sample were determined to be 30% and 77%, respectively.

As shown by FIGS. 30 and 31, a coke heat treated at 1700C, which can be described as a mixture of a well ordered graphite-like phase and a disordered carbon phase, can be accurately characterized by generating and analyzing a plot of changes in entropy ($\Delta S$) as a function of open circuit voltage. The ($\Delta S$) as a function of open circuit voltage experimental data obtained with this 1700 C sample was simulated as a combination of (i) $\Delta S$(OCV) of graphite (heat treated 2600C) and (ii) the $\Delta S$(OCV) of a purely disordered carbon (non heat treated coke). This allowed us to accurately determine the degree of graphitization of the carbonaceous material, which is an important characteristic for lithium storage applications.

As shown in this example, the present measuring systems provides a means of determining changes in entropy ($\Delta S$) and enthalphy ($\Delta S$) for reactions involving electrodes of electrochemical cells. Importantly, measured values of $\Delta S$ and/or $\Delta H$ may be plotted versus electrochemical cell composition or open circuit voltage to provide a means of quantitative characterization of the composition and/or physical state of the electrode material(s). This aspect of the present invention has significant application providing testing and/or quality control information of electrochemical cell materials (e.g. electrode materials), for example after discharge, cycling and/or exposure to overvoltages.

STATEMENTS REGARDING INCORPORATION BY REFERENCE AND VARIATIONS

The following references relate generally to the composition and function of electrochemical cells and the thermodynamic analysis of electrochemical data and are incorporated by reference in their entireties herein: Handbook of Batteries, Edited by David Linden and Thomas B. Reddy, Third Edition, McGraw-Hill, 2002; and Battery Technology Handbook, Edited by H. A. Kiehne, Marcel Dekker, Inc., 2003.

All references throughout this application, for example patent documents including issued or granted patents or equivalents; patent application publications; unpublished patent applications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

Any appendix or appendices hereto are incorporated by reference as part of the specification and/or drawings.

Where the terms "comprise", "comprises", "comprised", or "comprising" are used herein, they are to be interpreted as specifying the presence of the stated features, integers, steps, or components referred to, but not to preclude the presence or addition of one or more other feature, integer, step, component, or group thereof. Separate embodiments of the invention are also intended to be encompassed wherein the terms "comprising" or "comprise(s)" or "comprised" are optionally replaced with the terms, analogous in grammar, e.g.; "consisting/consist(s)" or "consisting essentially of/consist(s) essentially of" to thereby describe further embodiments that are not necessarily coextensive.

The invention has been described with reference to various specific and preferred embodiments and techniques. However, it should be understood that many variations and modifications may be made while remaining within the spirit and scope of the invention. It will be apparent to one of ordinary skill in the art that compositions, methods, devices, device elements, materials, procedures and techniques other than those specifically described herein can be applied to the practice of the invention as broadly disclosed herein without resort to undue experimentation. All art-known functional equivalents of compositions, methods, devices, device elements, materials, procedures and techniques described herein are intended to be encompassed by this invention. Whenever a range is disclosed, all subranges and individual values are intended to be encompassed as if separately set forth. This invention is not to be limited by the embodiments disclosed, including any shown in the drawings or exemplified in the specification, which are given by way of example or illustration and not of limitation. The scope of the invention shall be limited only by the claims.

REFERENCES

Y. Reynier, R. Yazami and B. Fultz, *J. Electrochem. Soc.* 151, A422 (2004).
A. Mabuchi, K. Tokumitsu, H. Fujimoto, T. Kasuh, *J. Electrochem. Soc.* 142, 1041 (1995).
A. Oberlin and G. Terriere, *Carbon*, 13, 367 (1975).
J. Mering and J. Maire, *J. Chim. Phys. Fr.* 57, 803 (1960).

F. Tuinstra and J. L. Koenig *J. Chem. Phys.* 53,1126 (1970).

N. Wada, P. J. Gaczi and S. A. Solin, *J. Non-Cryst. Solids* 35, 543 (1980).

R. Yazami and Y. Reynier, *J. Power Sources*, to be published (2005).

H. Kataoka, Y. Saito, O. Omae, J. Suzuki, K. Sekine, T. Kawamura and T. Takamurae, *Electrochem. and Solid-State Lett.*, 5, A10 (2002).

P. Papanek, M. Radosavljevic and J. E. Fischer, *Chem. Mater.* 8,1519 (1996).

Y. Mori, T. Iriyama, T. Hashimoto, S. Yamazaki, F. Kawakami, H. Shiroki and T. Yamabe, *J. Power Sources* 56, 205 (1995).

M. Letellier, F. Chevallier, F. Béguin, E. Frackowiak, J-N. Rouzau, *J. Phys. and Chem. of Solids* 65, 245 (2004).

P. Papanek, W. A. Kamitakahara, P. Zhou and J. E. Fischer, *J. Phys. Condens. Matter* 13,8287 (2001).

D. A. Stevens and J. R. Dahn, *J. Electrochem. Soc.* 148, A803 (2001).

G. Bathia, R. K. Aggarwal, N. Punjabi and O. P. Bahl, *J. Mater. Science* 32,135 (1997).

We claim:

1. A measurement system for thermodynamically evaluating an electrochemical cell having electrodes; said system comprising:

a means for measuring open circuit voltages of said electrochemical cell as a function of time;

a composition controller electrically connected to said electrochemical cell for establishing selected electrochemical cell compositions, said composition controller configured for establishing a plurality of said selected compositions;

a temperature controller in thermal contact with said electrochemical cell for establishing a plurality of selected electrochemical cell temperatures for each of said selected compositions, thereby establishing a plurality of selected electrochemical cell temperature and composition combinations; and an open circuit voltage analyzer for receiving open circuit voltage measurements as a function of time from said means for measuring open circuit voltages and for identifying open circuit voltages for thermochemically stabilized conditions of said electrochemical cell for said selected electrochemical cell temperature and composition combinations;

wherein one of said electrodes is an intercalating electrode and the selected electrochemical cell compositions correspond to different stoichiometries of an intercalant incorporated with said intercalating electrode of said electrochemical cell.

2. The system of claim 1 wherein said means for measuring open circuit voltages is configured for measuring said open circuit voltages of said electrochemical cell with an accuracy to within 1 mV.

3. The system of claim 1 wherein said means for measuring open circuit voltages comprises a voltmeter, a multimeter, a potentiometer, or a galvanometer.

4. The system of claim 1 wherein said composition controller is an electrochemical cell charger configured for charging said electrochemical cell, an electrochemical cell discharger configured for discharging said electrochemical cell or both.

5. The system of claim 4 wherein said composition controller is configured for charging or discharging said electrochemical cell under galvanostatic conditions.

6. The system of claim 1 wherein said composition controller comprises a coulometer.

7. The system of claim 1 wherein said composition controller is configured for establishing a selected state of charge of said electrochemical cell corresponding to each of said selected electrochemical cell compositions.

8. The system of claim 1 wherein said composition controller is configured for establishing a selected state of charge of said electrochemical cell corresponding to each of said selected electrochemical cell compositions with an accuracy to within about 5%.

9. The system of claim 1 wherein said composition controller is configured for establishing open circuit voltages corresponding to each of said selected electrochemical cell compositions.

10. The system of claim 1 wherein said composition controller establishes a selected composition of at least one of said electrodes.

11. The system of claim 1 wherein said temperature controller establishes said selected electrochemical cell temperatures with an accuracy equal to or greater than about 0.1 degrees Kelvin.

12. The system of claim 1 wherein said temperature controller comprises a heater or a cooler.

13. The system of claim 12 wherein said heater or cooler is selected from the group consisting of a thermoelectric cooler, thermoelectric heater, resistive heater, temperature bath, heat pump or radiative cooler.

14. The system of claim 1 wherein said temperature controller comprises a Peltier plate thermoelectric cooler.

15. The system of claim 12 wherein said temperature controller further comprises a thermocouple in thermal contact with said electrochemical cell for measuring the temperature of said electrochemical cell.

16. The system of claim 15 wherein said temperature controller further comprises a processor for receiving temperature measurements from said thermocouple and for providing feedback control of said heater or cooler so as to establish said selected electrochemical cell temperatures.

17. The system of claim 1 wherein said open circuit voltage analyzer is a processor configured for executing an algorithm that calculates observed rates of change in open circuit voltage per unit time for a selected electrochemical cell temperature and composition combination using said open circuit voltage measurements as a function of time received from said means of measuring open circuit voltage.

18. The system of claim 17 wherein said algorithm compares absolute values of said observed rates of change in open circuit voltage per unit time for said selected electrochemical cell temperature and composition combination to a threshold rate of change in open circuit voltage per unit time, and wherein said algorithm identifies an open circuit voltage equal to said open circuit voltage of said electrochemical cell for thermochemically stabilized conditions for said selected electrochemical cell temperature and composition combination when the absolute value of the observed rate of change in open circuit voltage per unit time is equal to or less than said threshold rate of change in open circuit voltage per unit time.

19. The system of claim 18 wherein said threshold rate of change in open circuit voltage as a function of time is equal to or less than $1.0$ mV h$^{-1}$.

20. The system of claim 18 wherein said threshold rate of change in open circuit voltage as a function of time is equal to or less than $0.1$ mV h$^{-1}$.

21. The system of claim 1 wherein said electrochemical cell is a primary battery, or secondary battery.

22. The system of claim 1 wherein the selected electrochemical cell compositions also correspond to states of charge said electrodes.

23. The system of claim 1 wherein the selected electrochemical cell compositions also correspond to amounts of said intercalant physically associated with said intercalating electrode of said electrochemical cell.

24. The system of claim 1 wherein said electrochemical cell further comprises an electrolyte in contact with one or both of said electrode.

25. The system of claim 1 further comprising a reference electrode in electrical contact with at least one of said electrodes.

26. The system of claim 1 wherein said electrochemical cell comprises a two electrode cell comprising a counter electrode and a working electrode, wherein said counter electrode is configured for being integrated to a reference electrode.

27. The system of claim 1 wherein said electrochemical cell comprises a two electrode cell comprising a first working electrode and a second working electrode, wherein said first working electrode is a positive pole of said electrochemical cell and said second working electrode is a negative pole of said electrochemical cell, said electrochemical cell comprising a primary or secondary battery.

28. A method for thermodynamically evaluating an electrochemical cell having electrodes; said method comprising the steps of:
   controlling the composition of said electrochemical cell to establish a plurality of selected electrochemical cell compositions;
   controlling the temperature of said electrochemical cell to establish a plurality of selected electrochemical cell temperatures for each of said selected electrochemical cell compositions, thereby establishing a plurality of selected electrochemical cell temperature and composition combinations;
   measuring open circuit voltages of said electrochemical cell as a function of time for said selected electrochemical cell compositions and said selected electrochemical cell temperatures; and
   identifying open circuit voltages for thermochemically stabilized conditions of said electrochemical cell for said selected electrochemical cell temperature and composition combinations,
   wherein at least one of said electrodes is an intercalating electrode, and the step of controlling the composition of said electrochemical cell establishes a selected stoichiometry of an intercalant in said intercalating electrode.

29. The method of claim 28 wherein said selected electrochemical cell compositions are established by charging or discharging said electrochemical cell.

30. The method of claim 28 wherein said step of controlling the composition of said electrochemical cell is carried out by also establishing selected states of charge of said electrochemical cell corresponding to each of said selected electrochemical cell compositions.

31. The method of claim 28 wherein said step of controlling the composition of said electrochemical cell is also carried out by establishing selected states of charge of said intercalating electrode.

32. The method of claim 28 wherein said step of controlling the composition of said electrochemical cell is carried out by establishing open circuit voltages or state of charges corresponding to each of said selected electrochemical cell compositions.

33. The method of claim 28 wherein said step of identifying open circuit voltages for thermochemically stabilized conditions of said electrochemical cell comprises the steps of:
   calculating observed rates of change in open circuit voltage per unit time for said combinations of selected electrochemical cell compositions and selected electrochemical cell temperatures using said open circuit voltage measurements as a function of time;
   comparing absolute values of said observed rates of change in open circuit voltage per unit time for a combination of a selected electrochemical cell composition and a selected electrochemical cell temperature to a threshold rate of change in open circuit voltage per unit time; and
   identifying an open circuit voltage that is equal to said open circuit voltage of said electrochemical cell for thermochemically stabilized conditions for a selected electrochemical cell composition and a selected electrochemical cell temperature when the absolute value of the observed rate of change in open circuit voltage per unit time is equal to or less than said threshold rate of change in open circuit voltage per unit time, wherein said threshold rate of change in open circuit voltage as a function of time is equal to or less than $1\ mV\ h^{-1}$.

34. The method of claim 28 further comprising the steps of generating plots of said open circuit voltages of said electrochemical cell for thermochemically stabilized conditions versus temperature for each of said selected electrochemical cell compositions.

35. The method of claim 34 further comprising the steps of determining slopes and intercepts for each of said plots, wherein said slopes correspond to changes in entropy for reactions at said electrodes of said electrochemical cell, and said intercepts corresponds to changes in enthalpy for reactions at said electrodes of said electrochemical cell.

36. The method of claim 35 further comprising the step of generating a plot of said changes in entropy or enthalpy versus said selected compositions.

37. The method of claim 28 comprising a method selected from the group consisting of: a method of predicting the capacity, specific energy, power, cycle life, cell voltage, stability or discharge current of said electrochemical cell; a method of assessing the composition, morphology, phase or physical state of said electrodes; a method of identifying surface defects, bulk defects or crystal structure defects in said electrodes; and a method of identifying a phase transition in said electrodes.

38. A measurement system for thermodynamically evaluating an electrochemical cell having electrodes; said system comprising:
   a means for measuring open circuit voltages of said electrochemical cell as a function of time;
   a composition controller electrically connected to said electrochemical cell for establishing selected electrochemical cell compositions, said composition controller configured for establishing a plurality of said selected compositions;
   a temperature controller in thermal contact with said electrochemical cell for establishing a plurality of selected electrochemical cell temperatures for each of said selected compositions, thereby establishing a plurality of selected electrochemical cell temperature and composition combinations; and an open circuit voltage analyzer for receiving open circuit voltage measurements as a function of time from said means for measuring open circuit voltages and for identifying open circuit voltages for thermochemically stabilized conditions of said electrochemical cell for said selected electrochemical cell temperature and composition combinations; wherein said open circuit voltage analyzer is a processor configured for executing an algorithm that calculates observed rates of change in open circuit voltage per unit time for a selected electrochemical cell temperature and composition combination using said open circuit voltage measurements as a function of time received from said means of measuring open circuit voltage; wherein said algorithm compares absolute values of said observed rates of change in open circuit voltage per unit time for said selected electrochemical cell temperature and composition combination to a threshold rate of change in open circuit voltage per unit time, and wherein said algorithm identifies an open circuit voltage equal to said open circuit voltage of said electrochemical cell for thermochemically stabilized conditions for said selected electrochemical cell temperature and composition combination when the absolute value of the observed rate of change in open circuit voltage per unit time is equal to or less than said threshold rate of change in open circuit voltage per unit time.

39. The system of claim 38 wherein said threshold rate of change in open circuit voltage as a function of time is equal to or less than 1.0 mV h$^{-1}$.

40. The system of claim 38 wherein said threshold rate of change in open circuit voltage as a function of time is equal to or less than 0.1 mV h$^{-1}$.

41. The system of claim 1 wherein said intercalating electrode is selected from the group consisting of a carbon electrode, a nanostructured metal oxide electrode, and a nano-phosphate electrode.

42. The system of claim 1 wherein said intercalating electrode comprises a carbonaceous material.

43. The system of claim 1 wherein said intercalating electrode comprises graphite.

44. The system of claim 1 wherein said intercalating electrode comprises disordered carbon or partially-graphitized carbon.

45. The system of claim 1 wherein said intercalating electrode comprises coke.

46. The system of claim 1 wherein said intercalating electrode comprises cobalt oxide.

47. The system of claim 1 wherein said intercalating electrode comprises $Mn_2O_4$, $FePO_4$, $PbO_2$, $CoO_2$, $NiOOH$, or $MnO_2$.

48. The system of claim 1 wherein said intercalating electrode comprises $LiCoO_2$, $LiMn_2O_4$, or $LiFePO_4$.

49. The system of claim 1 wherein said intercalant is lithium.

50. The system of claim 1 wherein said electrochemical cell is a lithium battery, a lithium ion battery, lead acid battery, manganese oxide alkaline battery, nickel cadmium battery, or a lithium polymer battery.

51. The method of claim 28 wherein said intercalating electrode is selected from the group consisting of a carbon electrode, a nanostructured metal oxide electrode, and a nano-phosphate electrode.

52. The method of claim 28 wherein said intercalating electrode comprises a carbonaceous material.

53. The method of claim 28 wherein said intercalating electrode comprises graphite.

54. The method of claim 28 wherein said intercalating electrode comprises disordered carbon or partially-graphitized carbon.

55. The method of claim 28 wherein said intercalating electrode comprises coke.

56. The method of claim 28 wherein said intercalating electrode comprises cobalt oxide.

57. The method of claim 28 wherein said intercalating electrode comprises $Mn_2O_4$, $FePO_4$, $PbO_2$, $CoO_2$, $NiOOH$, or $MnO_2$.

58. The method of claim 28 wherein said intercalating electrode comprises $LiCoO_2$, $LiMn_2O_4$, or $LiFePO_4$.

59. The method of claim 28 wherein said intercalant comprises lithium.

60. The method of claim 28 wherein said electrochemical cell comprises a lithium battery, a lithium ion battery, lead acid battery, manganese oxide alkaline battery, nickel cadmium battery, or a lithium polymer battery.

* * * * *

UNITED STATES PATENT AND TRADEMARK OFFICE
CERTIFICATE OF CORRECTION

PATENT NO. : 7,595,611 B2  Page 1 of 1
APPLICATION NO. : 11/462290
DATED : September 29, 2009
INVENTOR(S) : Reynier et al.

It is certified that error appears in the above-identified patent and that said Letters Patent is hereby corrected as shown below:

Title Page, Item [*]

Delete the phrase "by 155 days" and insert --by 75 days--.

In the Specification:

In the listing of the Assignee on page 1, please replace "Cantre National de le Recherche Scientifique" with --Centre National de la Recherche Scientifique--.

In claim 22, column 36, line 67, please replace "charge said electrodes" with --charge of said intercalating electrode--.

In claim 24, column 37, line 7, please replace "both of said electrode" with --both of said electrodes--.

Signed and Sealed this

Twenty-fourth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,595,611 B2
APPLICATION NO. : 11/462290
DATED : September 29, 2009
INVENTOR(S) : Reynier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 256 days.

Signed and Sealed this

Fourteenth Day of December, 2010

David J. Kappos
*Director of the United States Patent and Trademark Office*